(12) United States Patent
Kokeguchi

(10) Patent No.: US 8,004,742 B2
(45) Date of Patent: Aug. 23, 2011

(54) ELECTROCHROMIC DISPLAY DEVICE

(75) Inventor: Noriyuki Kokeguchi, Kokubunji (JP)

(73) Assignee: Konica Minolta Holdings, Inc. (JP)

( * ) Notice: Subject to any disclaimer, the term of this patent is extended or adjusted under 35 U.S.C. 154(b) by 230 days.

(21) Appl. No.: 12/373,124

(22) PCT Filed: Jun. 28, 2007

(86) PCT No.: PCT/JP2007/062992
§ 371 (c)(1),
(2), (4) Date: Jan. 9, 2009

(87) PCT Pub. No.: WO2008/007563
PCT Pub. Date: Jan. 17, 2008

(65) Prior Publication Data
US 2009/0316249 A1 Dec. 24, 2009

(30) Foreign Application Priority Data
Jul. 12, 2006 (JP) .................................. 2006-191319

(51) Int. Cl.
*G02F 1/153* (2006.01)
(52) U.S. Cl. ........ 359/273; 359/265; 359/267; 359/268; 359/269; 252/586
(58) Field of Classification Search .......... 359/265–275; 252/586
See application file for complete search history.

(56) References Cited

U.S. PATENT DOCUMENTS

| 7,619,803 B2 * | 11/2009 | Kokeguchi et al. ........... 359/265 |
| 2006/0110638 A1 | 5/2006 | Corr et al. |
| 2006/0170665 A1 | 8/2006 | Morita et al. |

FOREIGN PATENT DOCUMENTS

| AU | 2004-207696 A1 | 8/2004 |
| CN | 1738884 A | 2/2006 |
| EP | 1443091 A1 | 8/2004 |
| EP | 1594938 A1 | 11/2005 |
| JP | 2003-315843 A | 11/2003 |
| JP | 2005-49772 A | 2/2005 |
| JP | 2006-519222 A | 8/2006 |
| KR | 10-2005-0096149 A | 10/2005 |
| WO | 2004/067673 A1 | 8/2004 |
| WO | 2004/068231 A1 | 8/2004 |

OTHER PUBLICATIONS

International Search Report for International Application No. PCT/JP2007/062992; Date of mailing Sep. 25, 2007 with English Translation.

* cited by examiner

*Primary Examiner* — Evelyn A. Lester
(74) *Attorney, Agent, or Firm* — Cantor Colburn LLP

(57) ABSTRACT

The present invention provides an electrochromic display device which can realize a reduction in color drift in storing images and has excellent memory properties. The electrochromic display device is an active matrix drive-type electrochromic display device containing opposed electrodes, at least one type of a porous layer containing titanium oxide with an electrochromic dye adsorbed thereon, and at least one type of a porous layer containing tin oxide. The active matrix drive-type electrochromic display device is characterized in that the tin oxide-containing porous layer is connected to a pixel circuit used in active matrix drive through one of the opposed electrodes.

20 Claims, 2 Drawing Sheets

VIEWING DIRECTION

VIEWING DIRECTION

ELECTROCHROMIC DISPLAY DEVICE

CROSS REFERENCE TO RELATED APPLICATIONS

This is a U.S. national stage of application No. PCT/JP2007/062992 filed on 28 Jun. 2007. Priority under 35 U.S.C. §119(a) and 35 U.S.C. §365(b) is claimed from Japanese Application No. 2006-191319 filed Jul. 12, 2006, the disclosure of which is also incorporated herein by reference.

FIELD OF THE INVENTION

The present invention relates to an electrochromic display device which can realize a reduction in color drift in storing an image.

BACKGROUND OF THE INVENTION

In recent years, along with enhancement of the operation rate of personal computers, and popularization of network infrastructure, as well as an increase in capacity of data storage and a decrease in its cost, occasions have increasingly occurred in which pieces of information such as documents and images, which have been provided in the form of paper printed matter, are received as simpler electronic information and viewed as received electronic information.

As viewing means for such electronic information, mainly employed are those of light emitting types such as conventional liquid crystal displays and CRTs or recent organic electroluminescence displays. Specifically, when electronic information includes document information, it is required to watch any of the above viewing means for a relatively long period. However, it is hardly stated that the above viewing means are human friendly. It is a common knowledge that light emitting type displays result in problems such as eye fatigue due to flicker, inconvenient portability, limitations in reading posture, necessity to look at still images, or an increase in power consumption when viewed for a long time.

As means to overcome the above drawbacks, known are reflection type displays (having memory function) which utilize outside light and consume no power to maintain images. However, it is difficult to state that due to the following reasons, they exhibit sufficient performance.

Namely, a system employing polarizing plates, such as a reflection type liquid crystal, results in a problem for a white display due to a low reflectance of approximately 40%. In addition, it is difficult to state that most methods to produce structuring members are simple and easy. Further, polymer dispersion type liquid crystals require high voltage and the contrast of the resulting images is insufficient because the difference in refractive indices between organic compounds is utilized. Still further, polymer network type liquid crystals result in problems such as application of high voltage and requirement of complicated TFT circuitry to enhance memory capability. Yet further, display devices employing electrophoresis require high voltage of at least 10 V and tend to suffer insufficient durability due to aggregation of electrophoretic particles.

On the other hand, electrochromic display devices, though being drivable at a low voltage of at most 3 V, result in insufficient color quality of black and common colors (namely yellow, magenta, cyan, blue, and red) and tend to result in problems such that, in order to secure memory capability, the display cell requires a complicated film structure such as vapor evaporation film.

As a method to overcome these problems of the electrochromic display technique, disclosed is, for example, an electrochromic display device employing an electrochromic display device which contains, between two electroconductive substrates at least one of which is transparent, a porous layer and an electrolyte containing an electrochromic dye which can be reversibly colored or decolored by means of at least one of an oxidizing reaction and an reducing reaction. It is stated that this electrochromic display device has a simple structure, the image is bright and easy to observe and that the electrochromic display device is capable of reducing power consumption (for example, refer to Patent Documents 1 and 2).

As the result of the intensive study by the present inventor, a new problem was found that, when the full color electrochromic display device produced according to the method of the abovementioned Patent Documents 1 or 2 was evaluated in terms of a memory property (in which the change of color hue with time was observed for the display device after a voltage was applied to the device and then the circuit was opened), color drift was observed with time, since the memory properties of each electrochromic dye forming the full color display were different.

| Patent Document 1 | WO 2004/068231 pamphlet |
| Patent Document 2 | WO 2004/067673 pamphlet |

DISCLOSURE OF THE INVENTION

Problem to be Solved by the Invention

The present invention was made in view of the abovementioned problem. Accordingly, an object of the present invention is to provide an electrochromic display device having an excellent memory property while exhibiting reduced color drift when an image is stored.

Means to Solve the Problem

Above object of the present invention is achieved by the following structures.

1. An electrochromic display device driven by an active matrix method comprising:
   a pair of opposing electrodes;
   at least one porous layer containing titanium oxide to which an electrochromic dye is adsorbed; and
   at least one porous layer containing tin oxide, wherein the porous layer containing tin oxide is connected to an active matrix pixel circuit through one of the opposing electrodes.
2. The electrochromic display device of Item 1, wherein the electrochromic dye is represented by following Formula (1):

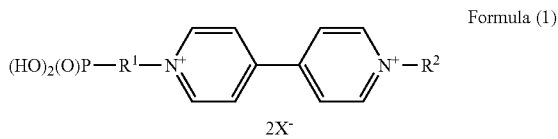

Formula (1)

[in Formula (1),
R$^1$ represents: —(CH$_2$)$_m$— (wherein m represents 0 or an integer of 1 to 10); an arylene group or a heteroarylene group each having not more than 14 carbon atoms; a branched alkylene group or an alkenylene group each having not more than 10 carbon atoms; or a cycloalkylene group, each of the arylene group, heteroarylene group, branched alkylene group, branched alkenylene group or cycloalkylene group may arbitrarily have a —P(O)(OH)$_2$ group through a —(CH$_2$)n- group or may be arbitrarily substituted, wherein n represents 0 or an integer of 1 to 10, $R^2$ represents a group represented by $R^3R^4$, wherein $R^3$ represents —(CH$_2$)$_p$— (wherein p represents 0 or an integer of 1 to 10), and $R^4$ represents: —P(O)(OH)$_2$ group; an aryl group or a heteroaryl group each having not more than 14 carbon atoms; a branched alkyl group or an alkenyl group each having not more than 10 carbon atoms; or a cycloalkyl group, $X^-$ represents an ion which neutralize the charge, wherein, when $R^2$ represents —(CH$_2$)$_2$—P(O)(OH)$_2$, $R^1$ is not —(CH$_2$)$_m$— (wherein m is 2 or 3), and when $R^2$ is a phenyl group, $R^1$ is not —(CH$_2$)$_m$— (wherein m is 2)].

3. The electrochromic display device of Item 1, wherein the electrochromic dye is represented by the following Formula (2):

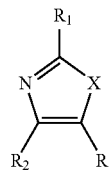

Formula (2)

[in Formula (2), $R_1$ represents a substituted or non-substituted aryl group, $R_2$, $R_3$ each represent a hydrogen atom or a substituent, X represents >N—$R_4$, an oxygen atom or a sulfur atom, and $R_4$ represents a hydrogen atom or a substituent].

4. The electrochromic display device of any one of Items 1 to 3, wherein a thickness of the porous layer containing titanium oxide or the porous layer containing tin oxide is 1 μm or more but 5 μm or less.

5. The electrochromic display device of any one of Items 1 to 4, wherein the electrochromic display device is capable of displaying a plurality of colors by stacking a plurality of electrochromic display devices.

6. The electrochromic display device of any one of Items 1 to 4, wherein the electrochromic display device is capable of displaying a plurality of colors by arranging a plurality of porous layers containing titanium oxide adsorbed with different electrochromic dyes to form a pattern between the opposing electrodes.

7. The electrochromic display device of any one of Items 1 to 5, wherein the electrochromic display device is capable of displaying a plurality of colors by adsorbing a plurality of electrochromic dyes to the same porous layer containing titanium oxide.

Effect of the Invention

By employing the abovementioned means of the present invention, an electrochromic display device having an excellent memory property while exhibiting reduced color drift when an image is stored can be provided.

| EXPLANATION OF NUMERALS | |
|---|---|
| 10 | Display Device |
| 12 | Gate Line |
| 13 | Source Line |
| 15 and 51 | Transparent Electrode |
| 16 | Gate Electrode |
| 17 | Gate Insulating Film |
| 18 | Semiconductor Layer |
| 19 | Source Electrode |
| 20 | Drain Electrode |
| 21 | Insulating Film |
| 30 | Porous Layer Containing Titanium Oxide |
| 40 | Electrolyte Layer |
| 52 | Porous Layer Containing Tin Oxide |

BEST MODE TO CARRY OUT THE INVENTION

Hereafter, the best mode to carry out the present invention will be described in detail.

As the result of an intensive study on the abovementioned problem, it was found that an electrochromic display device having an excellent memory property while exhibiting reduced color drift when an image is stored can be achieved by an electrochromic display device driven by an active matrix method containing: a pair of opposing electrodes; a porous layer containing titanium oxide to which an electrochromic dye is adsorbed; and a porous layer containing tin oxide, wherein the porous layer containing tin oxide is connected to an active matrix pixel circuit through one of the opposing electrodes.

The present invention will be explained below using the figures.

Figure 1:
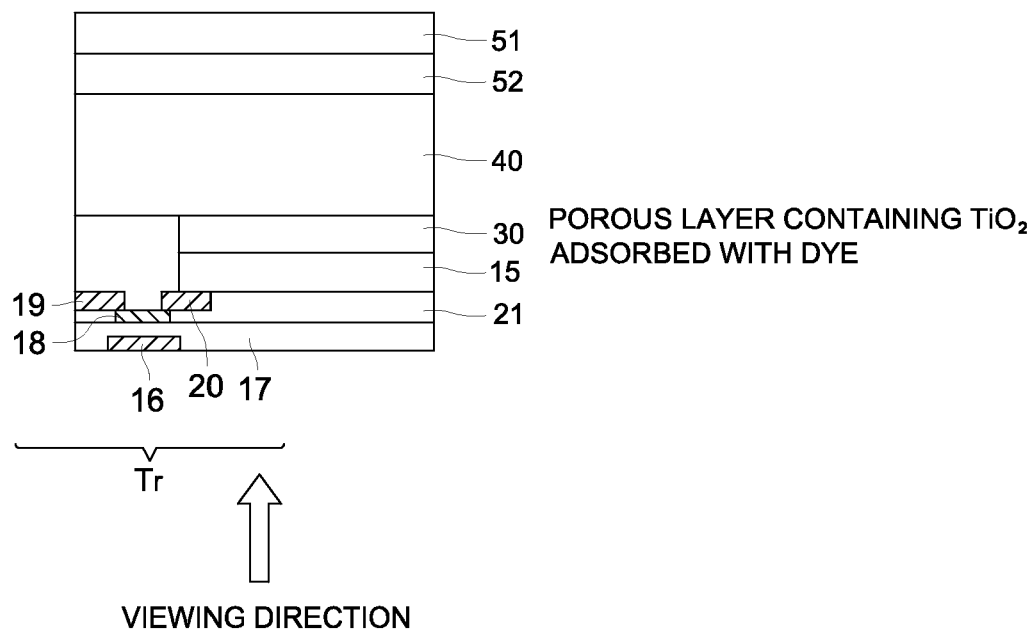
FIG. 1 illustrates a cross-sectional view of an example of a conventional electrochromic display device.

FIG. 1 illustrates a cross-sectional view of an example of a conventional electrochromic display device.

The transparent electrode 51, the porous layer 52 containing tin oxide, the electrolyte layer 40, the porous layer 30 containing titanium oxide to which an electrochromic dye was adsorbed, and the transparent electrode 15 are laminated in this order. A part of pixel circuit required for active-matrix driving and the porous layer 30 containing a titanium oxide layer are connected to the pixel circuit through the transparent electrode 15. As a part of the pixel circuit, the switching transistor containing the gate electrode 16, the source electrode 19, the drain electrode 20, and the semiconductor layer 18 was shown in the figure.

Figure 2:
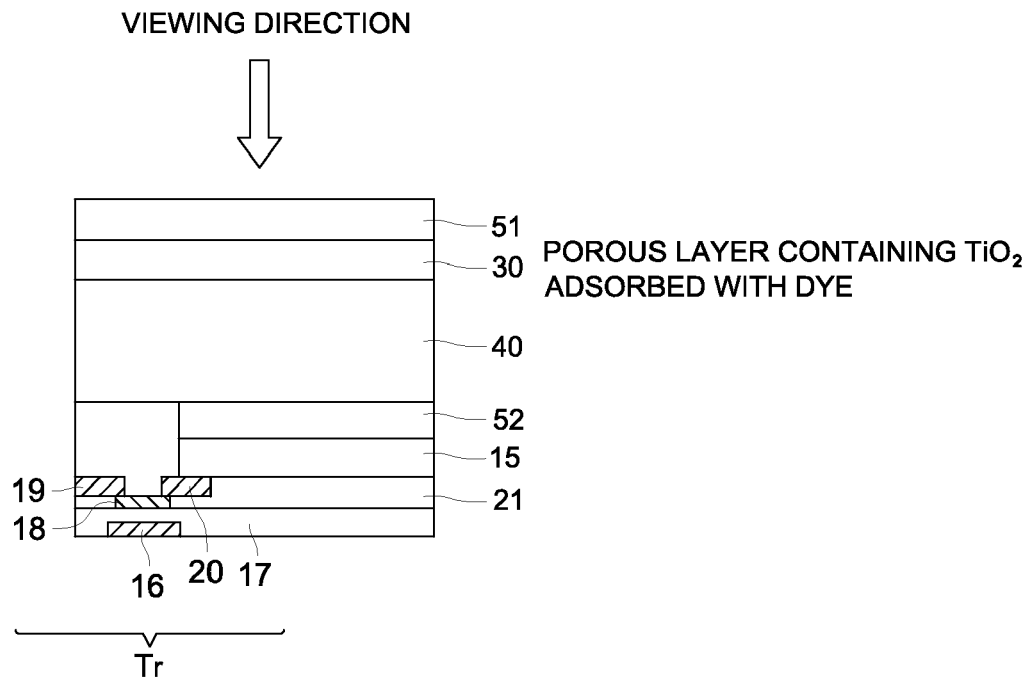
FIG. 2 illustrates a cross-sectional view of an example of an electrochromic display device of the present invention.

FIG. 2 shows a cross-sectional view of an example of an electrochromic display device of the present invention. The transparent electrode 51, the porous layer 30 containing titanium oxide to which an electrochromic dye is adsorbed, the electrolyte layer 40, the porous layer 52 containing tin oxide, and the transparent electrode 15 are laminated in this order. A part of pixel circuit required for active-matrix driving and the porous layer 52 containing tin oxide are connected through the transparent electrode 15.

In FIGS. 1 and 2, substrates, such as a glass used as the support of the transparent electrode substrate, are omitted.

In the construction of the conventional example (FIG. 1), the electrochromic dye which is adsorbed to the porous layer 30 containing a titanium oxide is connected to a part of pixel circuit through the transparent electrode. For this reason, while an image is stored, leakage of electric current to a pixel circuit occurs. Accordingly, decay of color tends to occur in the colored electrochromic dye in the construction of a conventional electrochromic display device. Specifically, in the case of a full color display in which plural kinds of electrochromic dyes are used, it is difficult to adjust the balance of color extinction among the plural kinds of electrochromic dyes while an image is stored, resulting in causing color drift while a color image is displayed.

On the contrary, in the construction of the present invention (FIG. 2), since the porous layer 30 containing the titanium oxide to which an electrochromic dye is adsorbed is in the state of disconnection with a part of pixel circuit, leakage of electric current is small, and the balance of color extinction can be easily adjusted, whereby the electrochromic display device has an advantage that color drift tends not occur while an image is stored. Further, by employing the construction of the present invention, decrease in an aperture ratio due to a pixel circuit can be reduced, whereby obtained is an advantage that both of high resolution and high contrast of the image can be simultaneously obtained.

Figure 3:
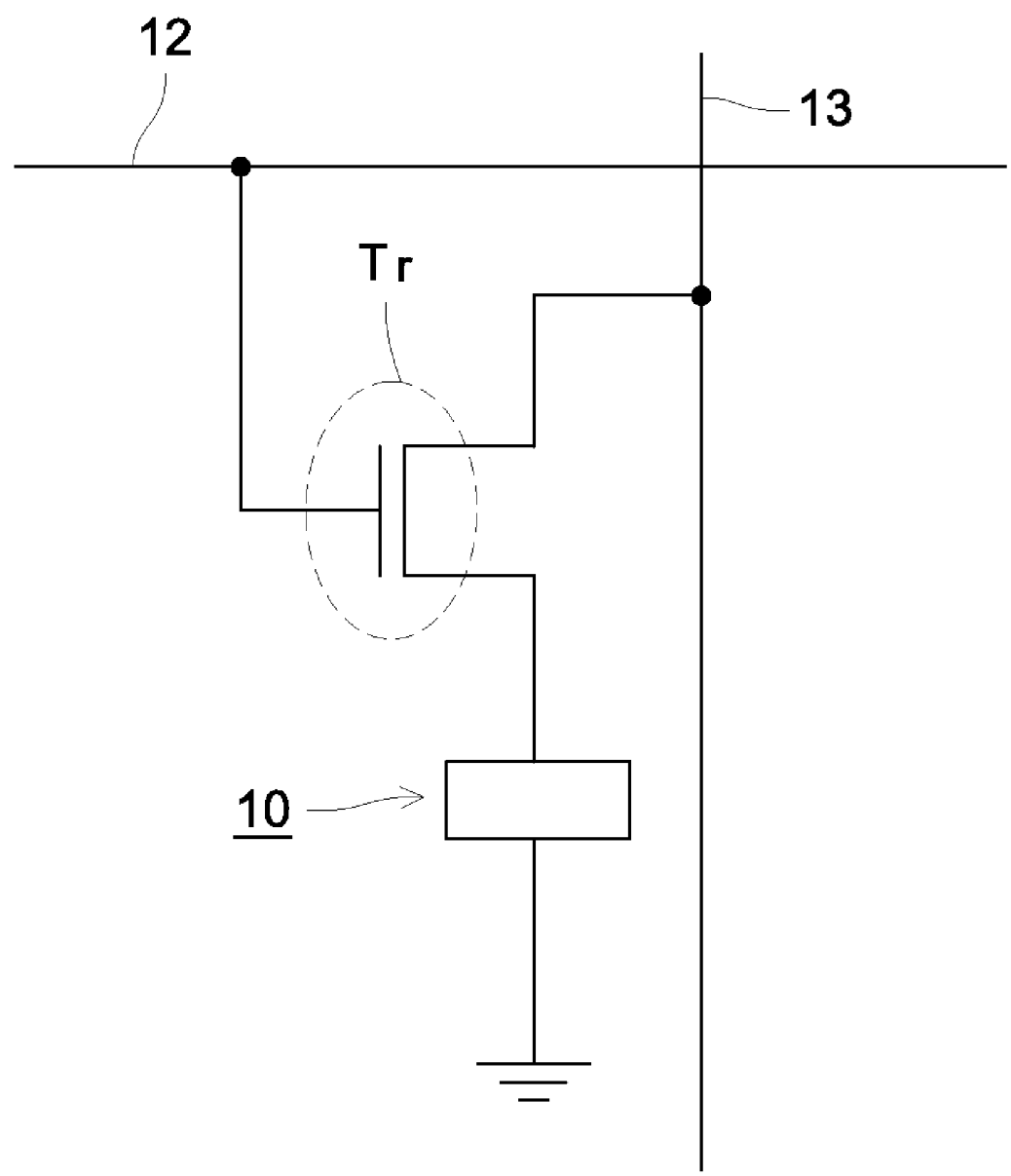
FIG. 3 is a schematic figure of an equivalent circuit showing an example of connection of a pixel circuit.

In FIGS. 1 and 2, only the switching transistor for color driving is shown for simplicity, however, the contact of the EC display device is taken with the drain of the switching transistor (therefore, in the method of the present invention, the porous layer 52 containing tin oxide which does not contain an electrochromic dye takes the contact). An example of the connection of the pixel circuit in the color driving method is illustrated in the equivalent circuit of FIG. 3.

In addition to the switching transistor Tr, a gate line driving circuit and a source line drive circuit (neither of them are illustrated) for selecting each pixel are provided at the end side of the gate line 12 and at the end side of the source line 13, respectively, and a signal control section (not shown) which controls the gate line driving circuit and the source line driving circuit is provided. When a gate signal is added to a prescribed gate line 12 by the gate line driving circuit controlled by the signal controlling section, the gate signal is added to the gate electrode of the switching transistor, and the transistor is turned on. The source signal added to the prescribed source line 13 is added to a pixel electrode from the source electrode through the drain electrode of the transistor, and a display is carried out by the display device 10.

<Electrochromic Dye>

As an electrochromic dye concerning the present invention, any compound which exhibits an electrochromic property is usable.

Specifically, dyes disclosed in, for example, Japanese Patent Application Publication Open to Public Inspection (hereafter referred to as JP-A) Nos. 62-297382, 63-286489, 3-54528, 5-224242, 5-98251, 2004-01729, 2000-241835, WO 2004/067673 can be cited.

For example, the compound represented by the following Formulas (1) is cited.

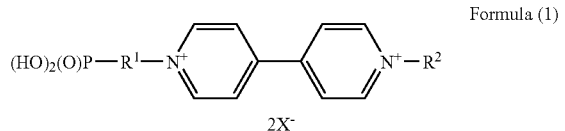

Formula (1)

[in Formula (1), $R^1$ represents: $-(CH_2)_m-$ (wherein m represents 0 or an integer of 1 to 10); an arylene group or a heteroarylene group each having not more than 14 carbon atoms; a branched alkylene group or an alkenylene group each having not more than 10 carbon atoms; or a cycloalkylene group. Each of the arylene group, heteroarylene group, branched alkylene group, branched alkenylene group or cycloalkylene group may arbitrarily have a $-P(O)(OH)_2$ group through a $-(CH_2)_n-$ group or may be arbitrarily substituted, wherein n represents 0 or an integer of 1 to 10.

$R^2$ represents a group represented by $R^3R^4$, wherein $R^3$ represents $-(CH_2)_p-$ (wherein p represents 0 or an integer of 1 to 10), and $R^4$ represents: $-P(O)(OH)_2$ group; an aryl group or a heteroaryl group each having not more than 14 carbon atoms; a branched alkyl group or an alkenyl group each having not more than 10 carbon atoms; or a cycloalkyl group.

$X^-$ represents an ion which neutralize the charge.

wherein, when $R^2$ represents $-(CH_2)_2-P(O)(OH)_2$, $R^1$ is not $-(CH_2)_m-$ (wherein m is 2 or 3), and, when $R^2$ is a phenyl group, $R^1$ is not $-(CH_2)_m-$ (wherein m is 2).]

Further, the above arylene group or heteroarylene group each having not more than 14 carbon atoms; branched alkylene group or alkenylene group each having not more than 10 carbon atoms; and the cycloalkylene group, which are each represented by $R^1$, may be arbitrarily substituted, or may be substituted by one substituent or two or more substituents, and, when they are substituted by two or more substituents, the substituents may be the same or different from each other.

Examples of the substituent include: a lower alkyl group, a lower alkenyl group, a phenyl-substituted lower alkyl group, a diphenyl-substituted lower alkyl group, a phenyl group, a phenoxy group, a lower alkanoyloxy group, a halogen atom, an amino group, a cyano group, a nitro group, a lower alkylamino group, a di-(lower alkyl) amino group, a phenylamino group, a lower alkanolamino group, a benzoylamino group, a lower alkylsulfonylamino group, a phenylsulfonylamino group, a lower alkanoyl group, a benzoyl group, a carboxyl group, a lower alkoxycarbonyl group, a carbamoyl group, an N-lower alkylcarbamoyl group, an N,N-di-(lower alkyl)carbamoyl group, an ureido group, an N-lower alkylureido group, a lower alkylsulfonyl group, a phenylsulfonyl group, a hydroxyl group, a lower alkoxy group, an amino group, a lower alkylamino group, a di-(lower alkyl)amino group, a halogen atom, a carboxyl group, or a lower alkoxy group substituted with a lower alkoxycarbonyl group, an alkoxy group having 3-7 carbon atoms, and a divalent methylenedioxy group.

The phenyl group contained in such as the above phenyl group, benzoyl group, and a phenylamino group may be substituted with, for example, a lower alkyl group, a lower alkoxy group, a hydroxy group, a halogen atom and/or a nitro group.

Moreover, for example, the aryl group, heteroaryl group, branched alkyl group, alkenyl group or cycloalkyl group represented by Formula (4) may be non-substituted, however, may be substituted with one or more groups defined as substituents of above $R^1$.

In abovementioned Formula (1), a preferable compound is: $R^1$ is $-(CH_2)_m$ (wherein m is 1, 2 or 3), a phenyl group (through $-(CH_2)_n-$ group and p-position is substituted with $-P(O)(OH)_2$, wherein n is 1 or 2)); and, in $R^2$ (represented by $R^3R^4$), $R_3$ represents $-(CH_2)_p-$ (wherein p is 0, 1, 2, or 3), $R^4$ is non-substituted phenyl or naphthyl, an alkyl group having 1-4 carbon atoms, a halogen atom, a cyano group, a nitro group, a phenoxy group, or a phenyl or naphthyl group mono-, di- or tri-substituted with a benzoyl group.

Further, $X^-$ is $Cl^-$, $Br^-$, $ClO_4^-$, $PF_6^-$, $BF_4^-$, $C_2F_6NO_4S_2^-$ or $CF_3SO_3^-$ and is specifically preferably $Cl^-$ and $PF_6^-$.

In abovementioned Formula (1), a preferable compound is: R¹ is —(CH₂)ₘ— (wherein m is 1, 2 or 3), a phenyl group (through —(CH₂)ₙ— group and p-position is substituted with —P(O)(OH)₂, wherein n is 1 or 2)); in R² (represented by R³R⁴), R₃ represents —(CH₂)ₚ— (wherein p is 0, 1, 2, or 3), R⁴ is non-substituted phenyl or naphthyl, an alkyl group having 1-4 carbon atoms, a halogen atom, a cyano group, a nitro group, a phenoxy group, or a phenyl or naphthyl group mono-, di- or tri-substituted with a benzoyl group; X⁻ is Cl⁻, Br⁻, ClO₄⁻, PF₆⁻, BF₄⁻, C₂F₆NO₄S₂⁻ or CF₃SO₃⁻ and is specifically preferably Cl⁻ and PF₆⁻.

Among the above compounds, preferable examples include:

(1) 1-phosphonoethyl-1'-(3-propylphenyl)-4,4'-bipyridinium dichloride
(2) 1-phosphonoethyl-1'-(3-propylphenyl)-4,4'-bipyridinium bis-hexafluorophosphate
(3) 1-phosphonoethyl-1'-(2,4,6-trimethylphenyl)-4,4'-bipyridinium dichloride
(4) 1-phosphonoethyl-1'-(2,4,6-trimethylphenyl)-4,4'-bipyridinium bis-hexafluorophosphate
(5) 1-phosphonoethyl-1'-(naphthyl)-4,4'-bipyridinium dichloride
(6) 1-phosphonoethyl-1'-(4-cyanonaphthyl)-4,4'-bipyridinium dichloride
(7) 1-phosphonoethyl-1'-(4-methylphenyl)-4,4'-bipyridinium dichloride
(8) 1-phosphonoethyl-1'-(4-cyanophenyl)-4,4'-bipyridinium dichloride
(9) 1-phosphonoethyl-1'-(4-fluorophenyl)-4,4'-bipyridinium dichloride
(10) 1-phosphonoethyl-1'-(4-phenoxyphenyl)-4,4'-bipyridinium dichloride
(11) 1-phosphonoethyl-1'-(4-t-butylphenyl)-4,4'-bipyridinium dichloride
(12) 1-phosphonoethyl-1'-(2,6-dimethylphenyl)-4,4'-bipyridinium dichloride
(13) 1-phosphonoethyl-1'-(3,5-dimethyl phenyl)-4,4'-bipyridinium dichloride
(14) 1-phosphonoethyl-1'-(4-benzophenone)-4,4'-bipyridinium dichloride
(15) 1-phosphonobenzyl-1'-(3-propyl phenyl)-4,4'-bipyridinium dichloride
(16) 1-phosphonobenzyl-1'-(3-propyl phenyl)-4,4'-bipyridinium bis-hexafluorophosphate
(17) 1-phosphonobenzyl-1'-(phosphonoethyl)-4,4'-bipyridinium dichloride
(18) 1-phosphonobenzyl-1'-(2,4-dinitrophenyl)-4,4'-bipyridinium dichloride
(19) 1-phosphonobenzyl-1'-(2,4-dinitrophenyl)-4,4'-bipyridinium bis-hexafluorophosphate
(20) 1-phosphonobenzyl-1'-(4-phenoxyphenyl)-4,4'-bipyridinium dichloride
21) 1-phosphonobenzyl-1'-(4-phenoxyphenyl)-4,4'-bipyridinium bis-hexafluorophosphate
(22) 1-phosphonobenzyl-1'-(4-fluoro phenyl)-4,4'-bipyridinium dichloride
(23) 1-phosphonobenzyl-1'-(4-methylphenyl)-4,4'-bipyridinium dichloride
(24) 1-phosphonobenzyl-1'-(2,4,6-trimethylphenyl)-4,4'-bipyridinium dichloride
(25) 1-phosphonobenzyl-1'-(benzyl)-4,4'-bipyridinium dichloride
(26) 1-phosphonobenzyl-1'-(naphthyl)-4,4'-bipyridinium dichloride
(27) 1-phosphonobenzyl-1'-(phenyl)-4,4'-bipyridinium dichloride
(28) 1-phosphonobenzyl-1'-(4-cyanophenyl)-4,4'-bipyridinium dichloride
(29) 1-phosphonobenzyl-1'-(4-benzophenone)-4,4'-bipyridinium dichloride
(30) 1-phosphonobenzyl-1'-(4-cyanophenyl)-4,4'-bipyridinium dichloride
(31) 1-phosphonobenzyl-1'-(2,6-dimethyl phenyl)-4,4'-bipyridinium dichloride
(32) 1-phosphonobenzyl-1'-(3,5-dimethylphenyl)-4,4'-bipyridinium dichloride
(33) 1-phosphonobenzyl-1'-(2,4,6-trimethylphenyl)-4,4'-bipyridinium trifluoromethanesulfoneimide The manufacturing methods of these compounds are disclosed in abovementioned WO 2004/067673.

Further, a compound represented by following Formula (2) is cited as a preferable electrochromic compound in the present invention.

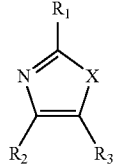

Formula (2)

in Formula (2), R₁ represents a substituted or non-substituted aryl group, R₂, R₃ each represent a hydrogen atom or a substituent, X represents >N—R₄, an oxygen atom or a sulfur atom, and R₄ represents a hydrogen atom or a substituent.

In Formula (2), R₁ represents a substituted or non-substituted aryl group, R₂, R₃ each represent a hydrogen atom or a substituent. Examples of a substituent represented by R₁, R₂ or R₃ include: an alkyl group (for example, a methyl group, an ethyl group, a propyl group, an isopropyl group, a tert-butyl, a pentyl group and a hexyl group), a cycloalkyl group (for example, a cyclohexyl group and a cyclopentyl group), and an alkenyl group, a cycloalkenyl group, an alkynyl group (for example, a propargyl group), a glycidyl group, an acrylate group, a methacrylate group, an aromatic group (for example, a phenyl group, a naphthyl group and an anthracenyl group), a heterocycle group (for example, a pyridyl group, a thiazolyl group, an oxazolyl group, an imidazolyl group, a furyl group, a pyrrolyl group, a pyrazinyl group, a pyrimidinyl group, a pyridazinyl group, a selenazolyl group, a thryhorany group, a piperizinyl group, a pyrazolyl group and a tetrazolyl group) an alkoxy group (for example, a methoxy group, an ethoxy group, a propyloxy group, a pentyloxy group, a cyclopentyloxy group, a hexyloxy group and a cyclohexyloxy group), an aryloxy group (for example, a phenoxy group), an alkoxycarbonyl group (for example, a methyloxycarbonyl group, an ethyloxycarbonyl group and a butyloxycarbonyl group), an aryloxycarbonyl group (for example, a phenyloxycarbonyl group), a sulfonamide group (for example, a methanesulfonamide group, an ethanesulfonamide group, a butanesulfonamide group, a hexane sulfonamide group, a cyclohexane sulfonamide group and a benzenesulfonamide group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, a phenylaminosulfonyl group and 2-pyridylaminosulfonyl group), a urethane group (for example, a methylureido group, an ethylureido group, and a pentylureido group, a cyclohexylureido group, a phenylureido group and 2-pyridylureido group), an acyl group (for example, an acetyl group, a propionyl group, a butanoyl group, and a hexanoyl group, a cyclohexanoyl group, a benzoyl and a pyridinoyl group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, a phenylaminocarbonyl group and a 2-pyridylaminocarbonyl group), an acylamino group (for example, an acetylamino group, a benzoylamino group and a methylureido group), an amide group (for example, an acetamide group, a propioneamide group, a butaneamide group, a hexaneamide group and a benzamide group), a sulfonyl group (for example, a methylsulfonyl group, an ethylsulfonyl group, a butylsulfonyl group, a cyclohexylsulfonyl group, a phenylsulfonyl group and a 2-pyridyl sulfonyl group), a sulfonamide group (for example, a methylsulfonamide group, an octylsulfonamide group, a phenylsulfonamide group and a naphthylsulfonamide group), an amino group (for example, an amino group, an ethylamino group, a dimethylamino group, a butylamino group, a cyclopentylamino group, an anilino group and 2-pyridylamino group), a halogen atom (for example, a chlorine atom, a bromine atom and an iodine atom), a cyano group, a nitro group, a sulfo group, a carboxyl group, a hydroxyl group, a phosphono group (for example, a phosphonoethyl group, a phosphonopropyl group and a phosphonooxyethyl group) and an oxamoyl group. These groups may further be substituted with these groups.

$R_1$ is a substituted or unsubstituted aryl group and preferably a substituted or unsubstituted phenyl group and further preferably a substituted or unsubstituted 2-hydroxyphenyl group or 4-hydroxyphenyl group.

$R_2$ and $R_3$ each are preferably an alkyl group, a cycloalkyl group, an aromatic group or a heterocycle group, more preferably, one of $R_2$ and $R_3$ is a phenyl group and the other is an alkyl group and further more preferably, both of $R_2$ and $R_3$ are a phenyl group.

X is preferably >N—$R_4$. $R_4$ is preferably a hydrogen atom, an alkyl group, an aromatic group, a heterocycle group or an acyl group and more preferably a hydrogen atom, an alkyl group having 1 to 10 carbon atoms, an aryl group having 5 to 10 carbon atoms or an acyl group.

Example of a concrete compound of an electrochromic compound represented by Formula (2) will be shown below, however, the present invention is not limited to these exemplified compounds.

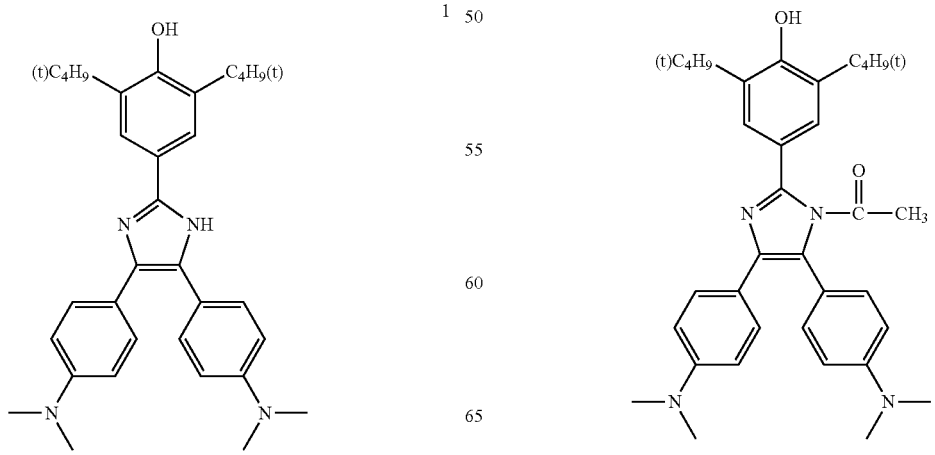

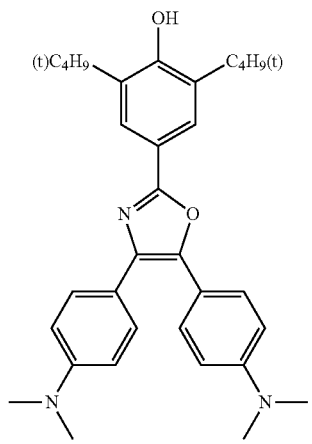

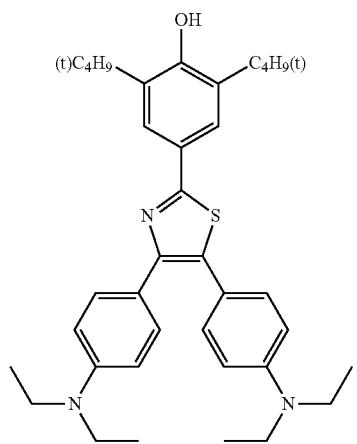

11
-continued
5
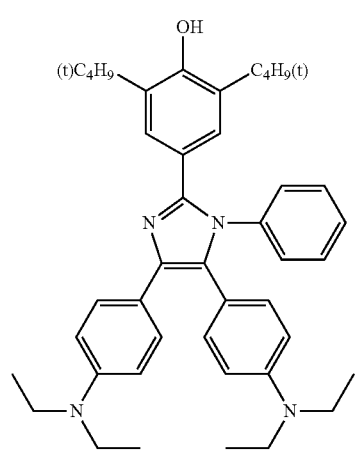
6
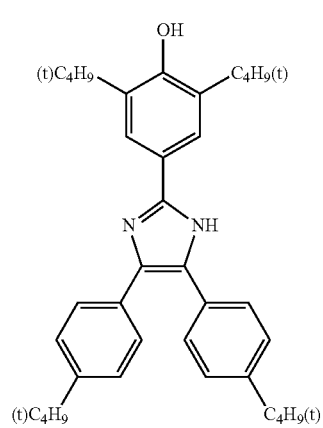
7
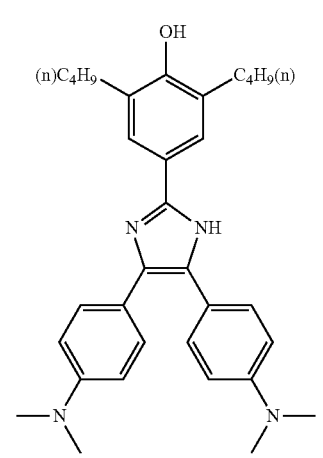
12
-continued
8
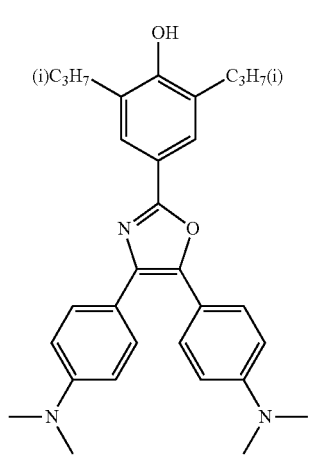
9
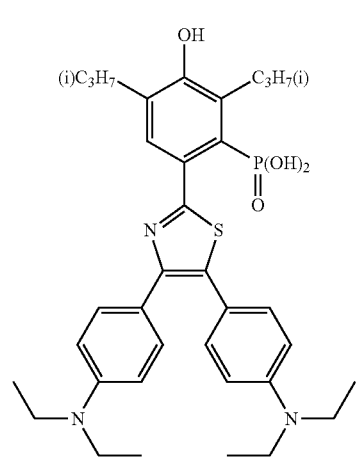
10
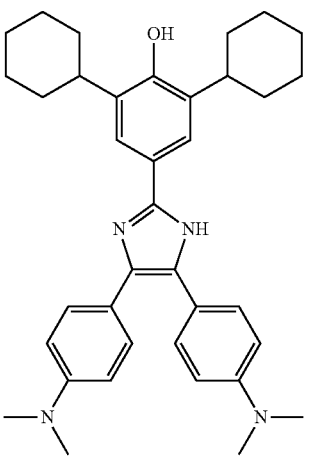

13
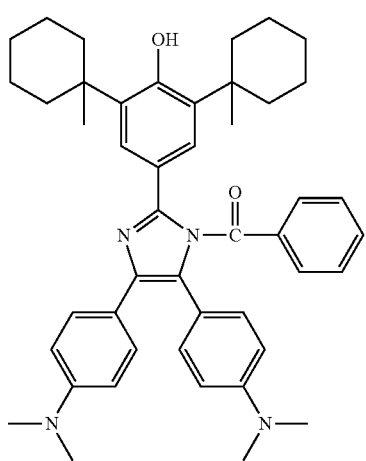
12
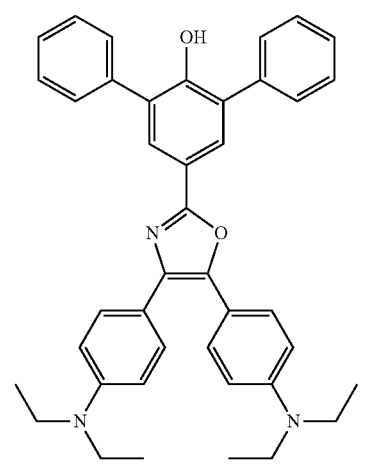
13
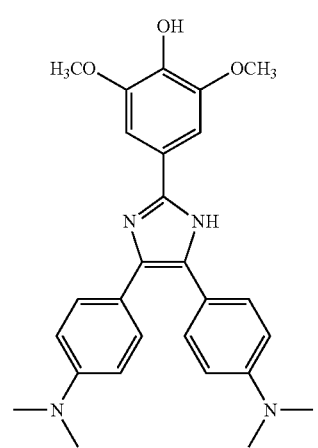
14
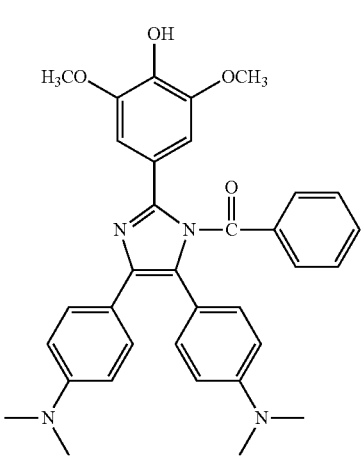
15
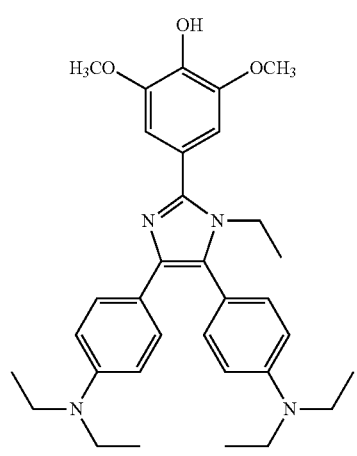
16
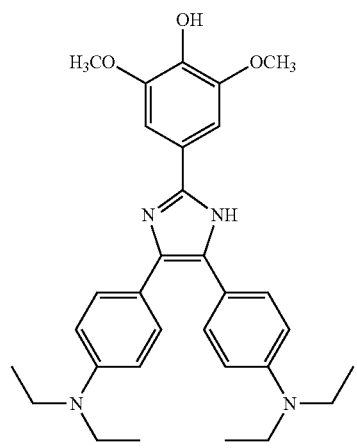

17
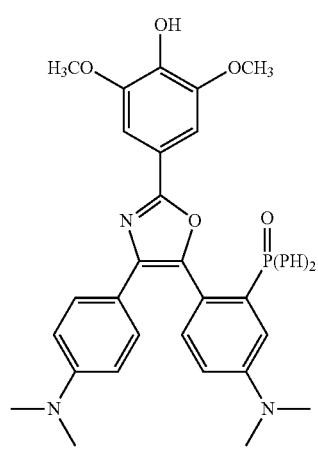
18
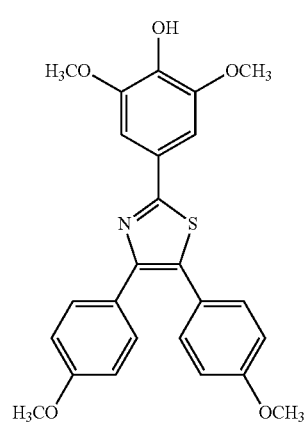
19
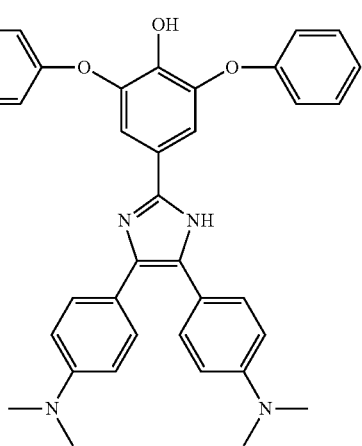
20
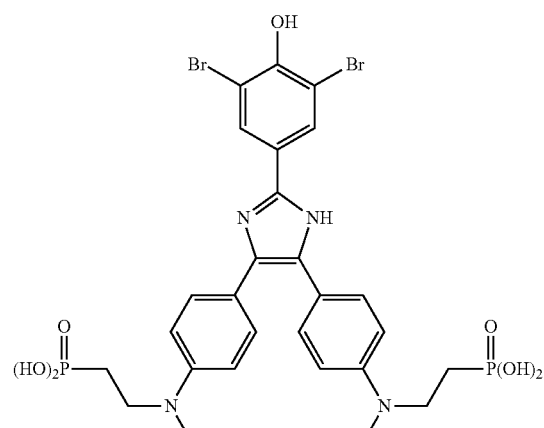
21
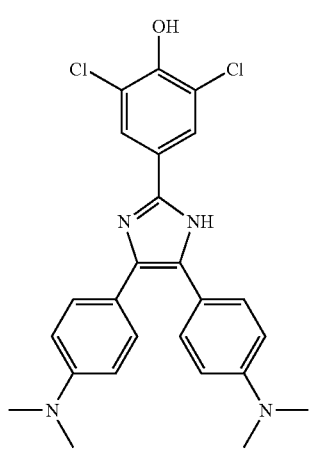
22
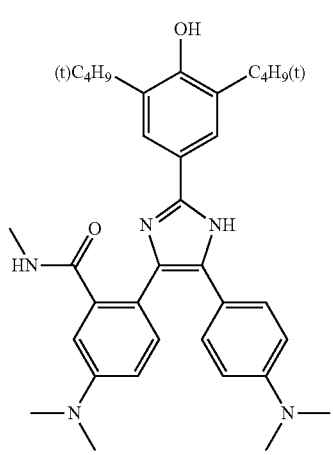

23
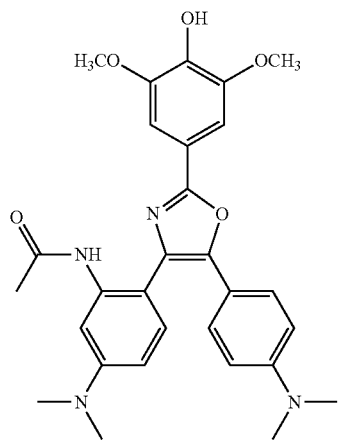
24
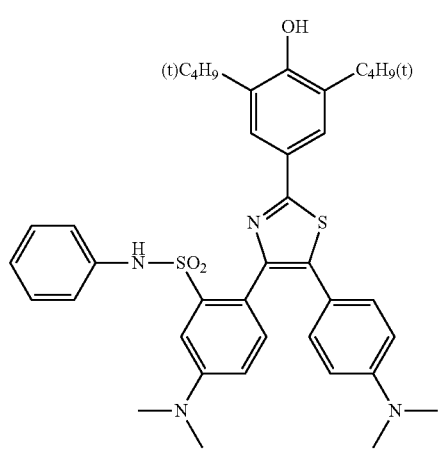
25
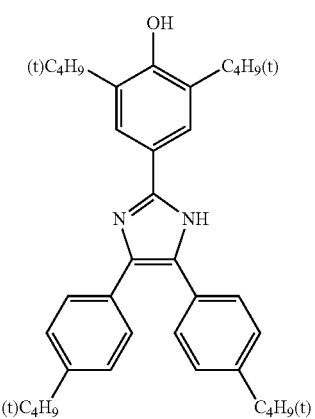
26
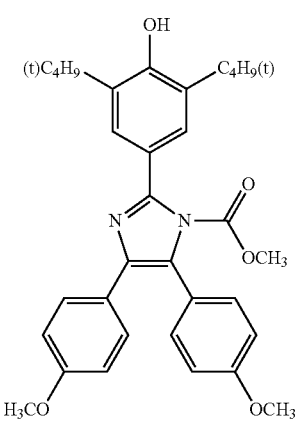
27
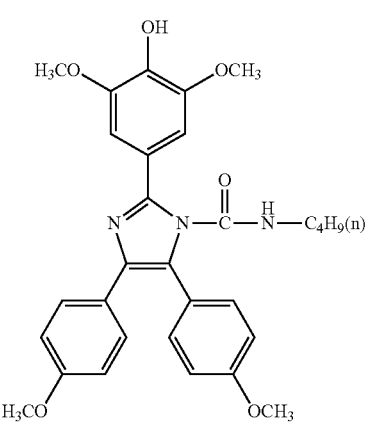
28
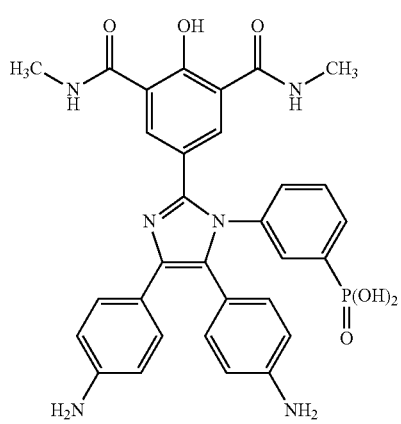

29
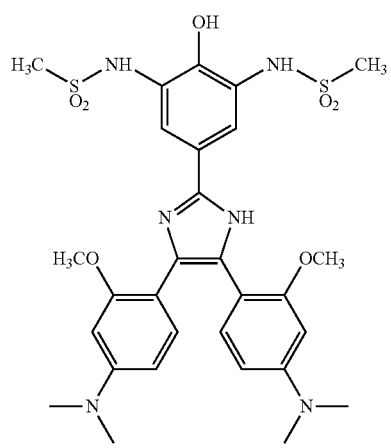
30
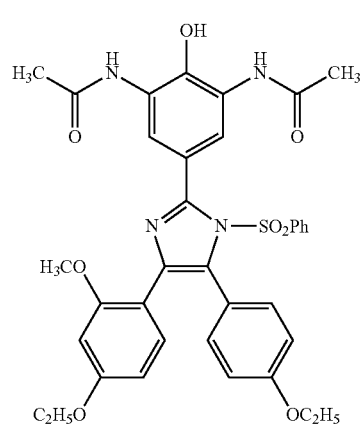
31
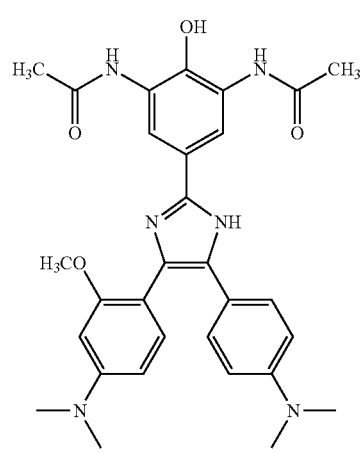
32
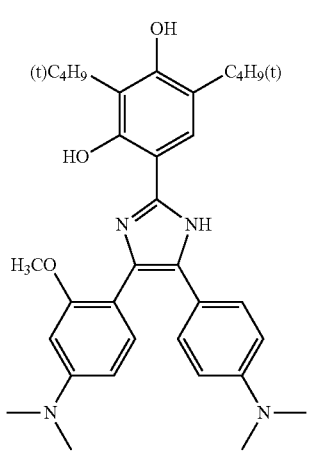
33
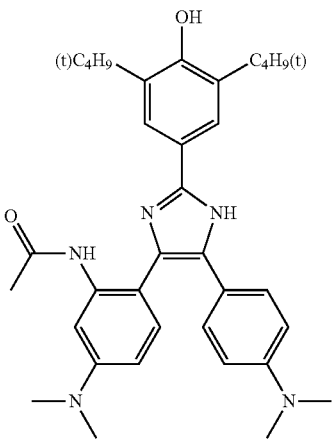
34
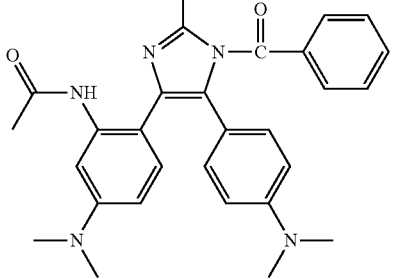

35
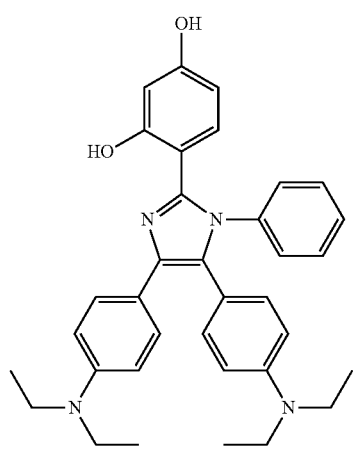
36
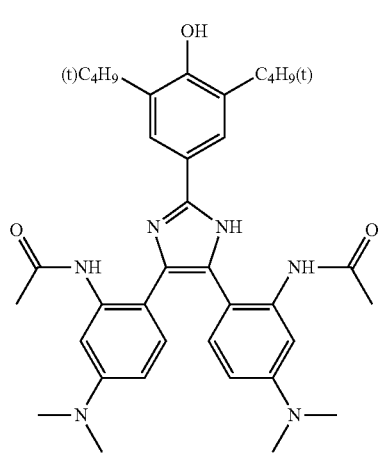
37
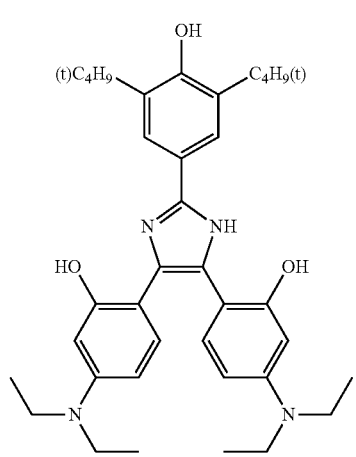
38
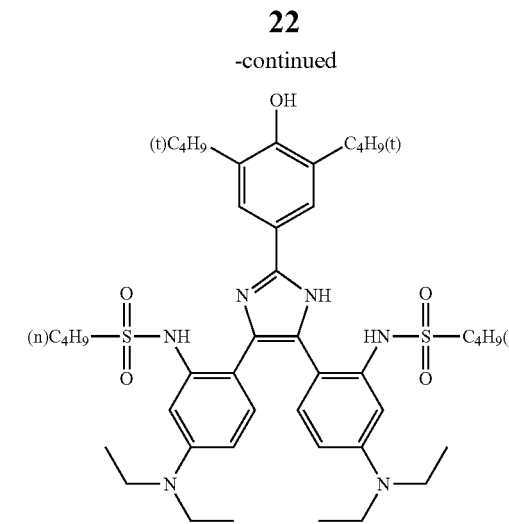
39
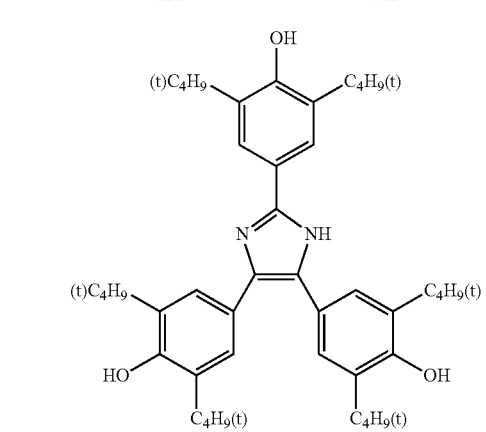
40
41

42
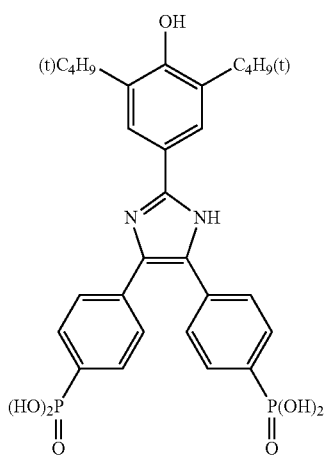
43
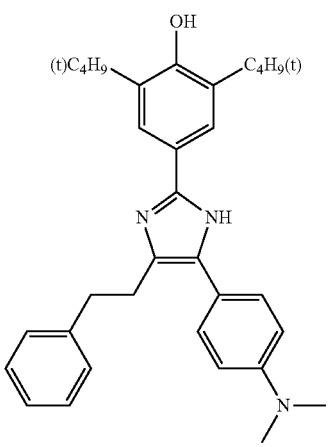
44
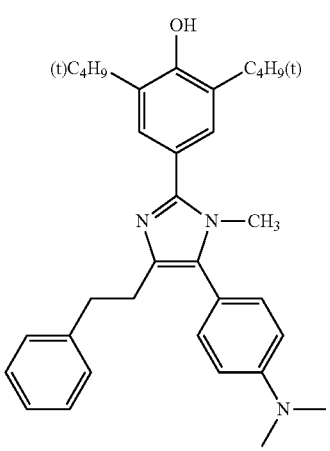
45
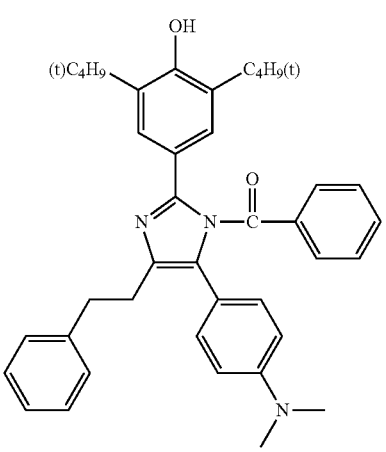
46
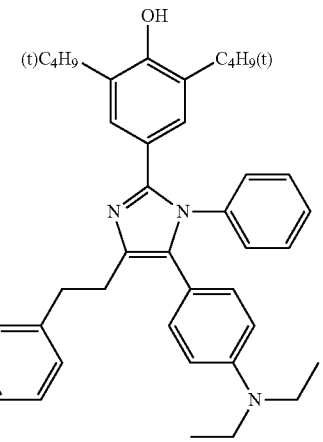
47
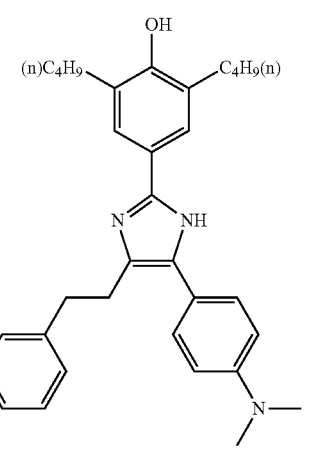

48
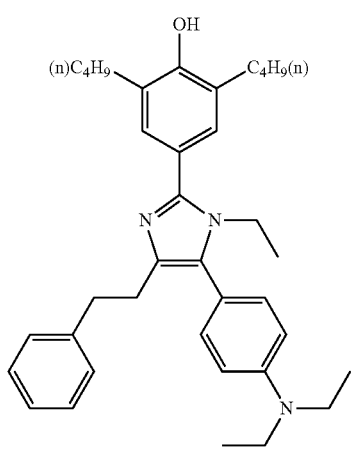
49
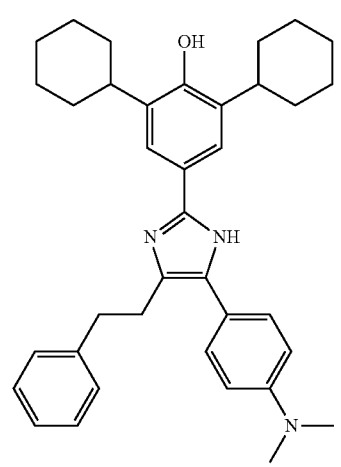
50
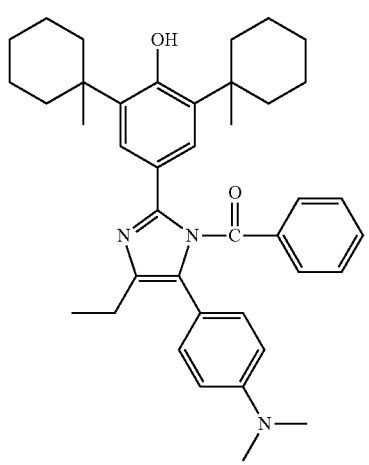
51
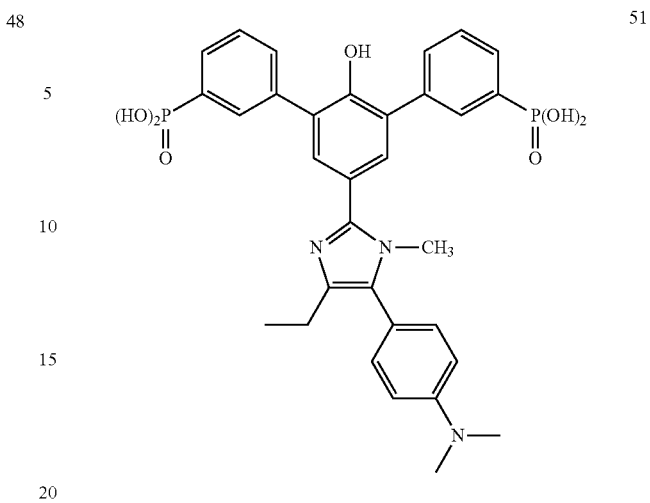
52
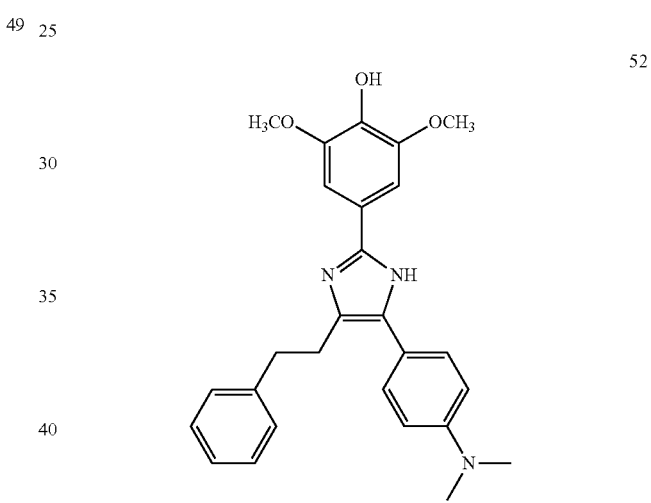
53
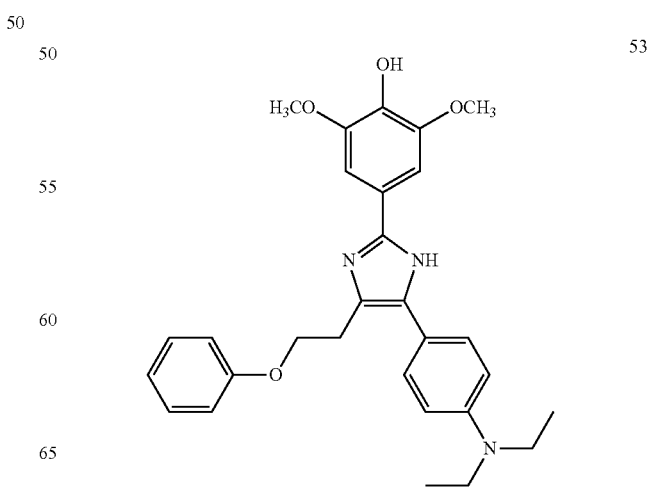

27
-continued
54
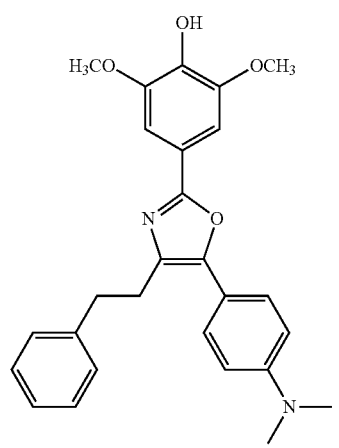
55
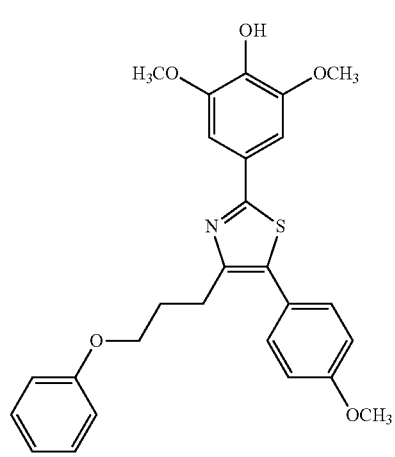
56
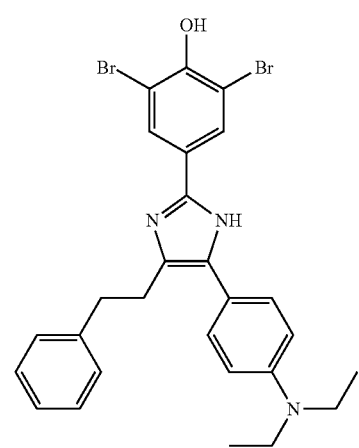
28
-continued
57
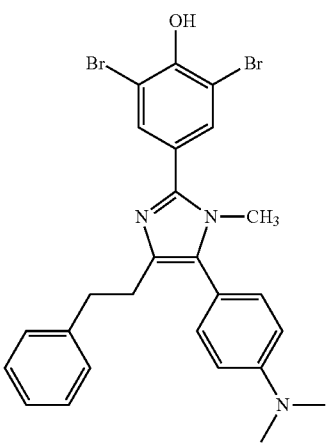
58
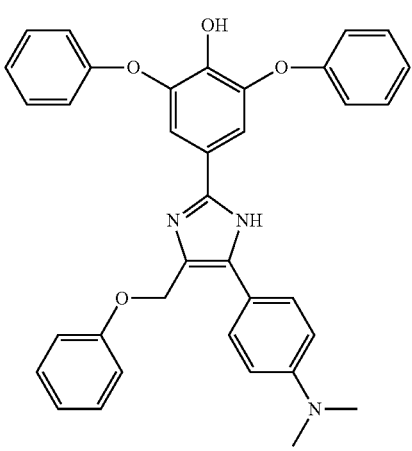
59
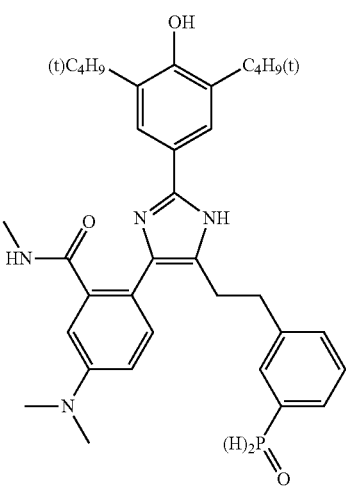

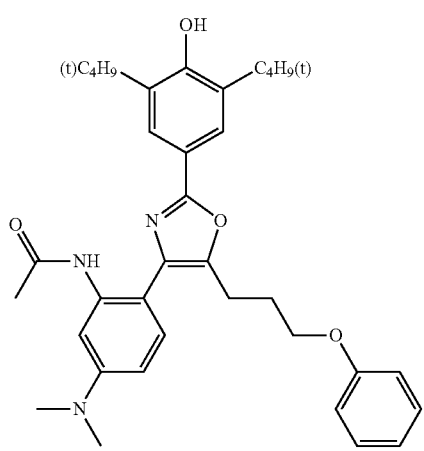
60
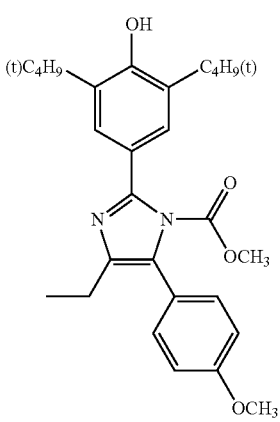
63
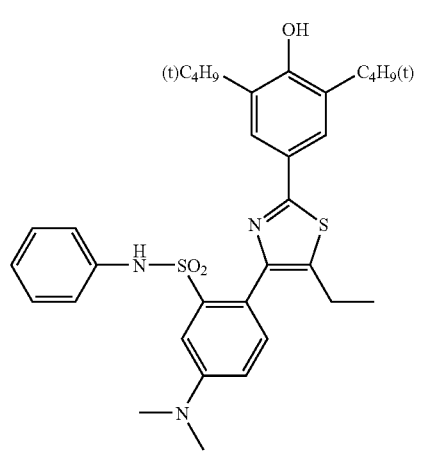
61
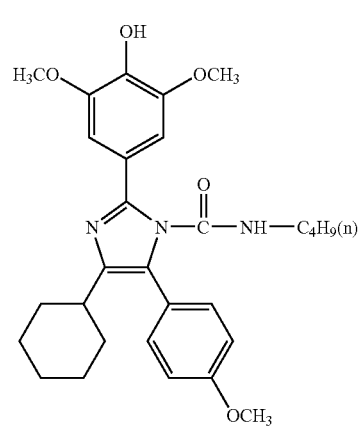
64
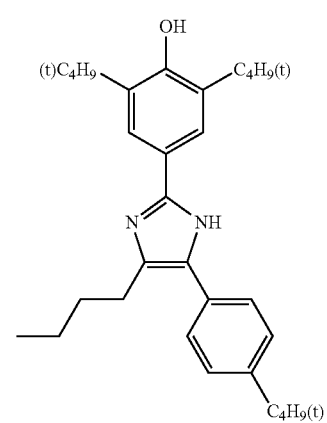
62
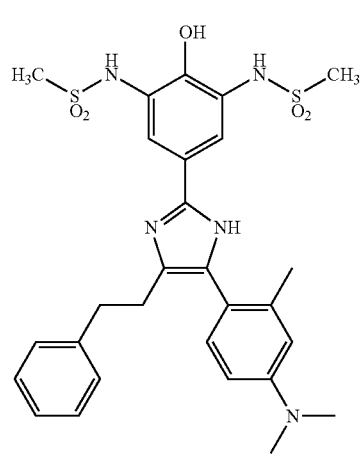
65

31
-continued
66
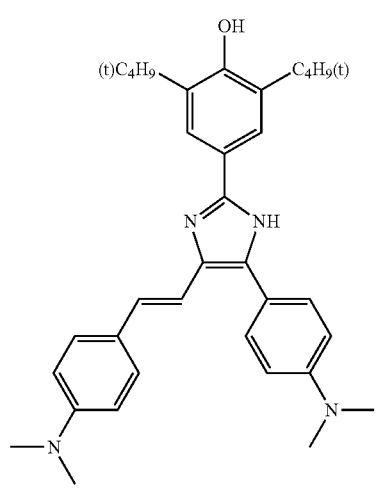
67
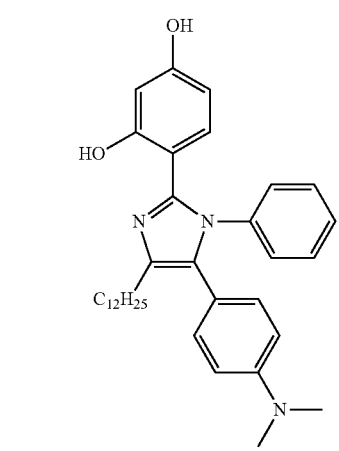
68
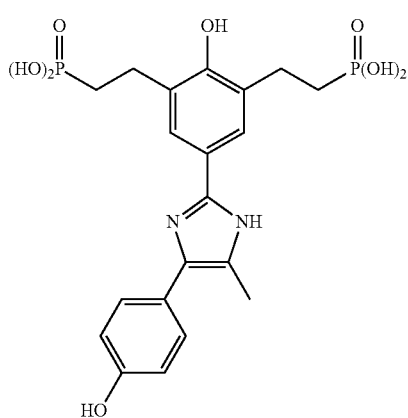
32
-continued
69
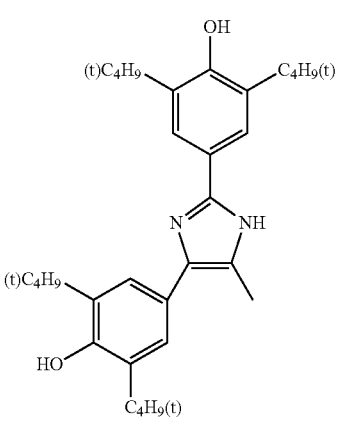
70
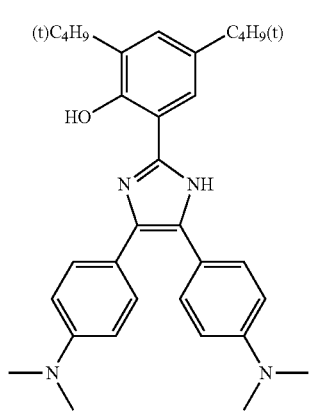
71
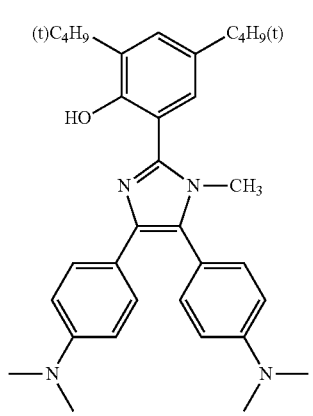
72
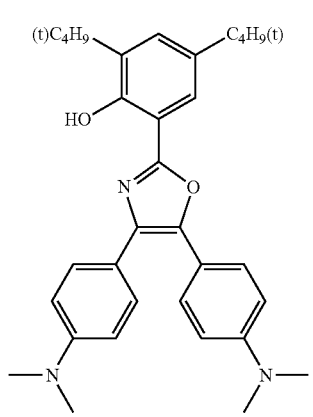

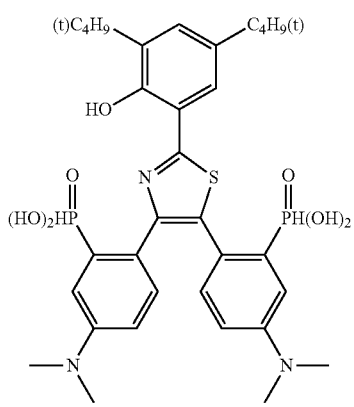
73
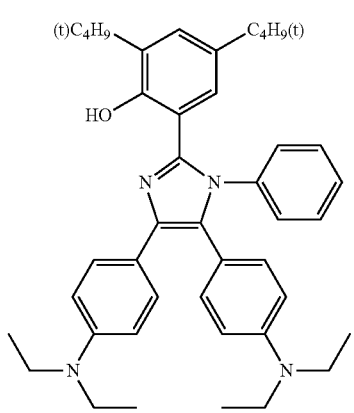
74
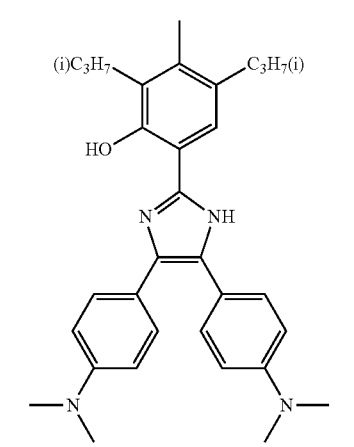
75
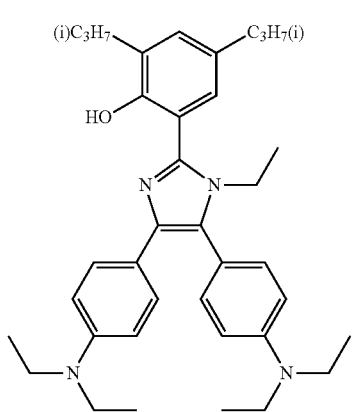
76
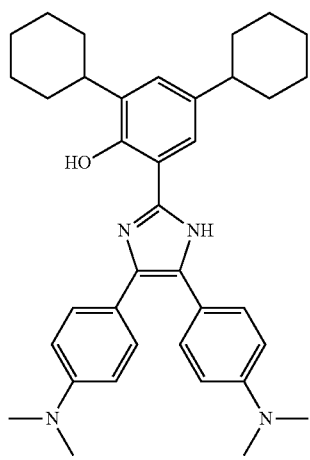
77
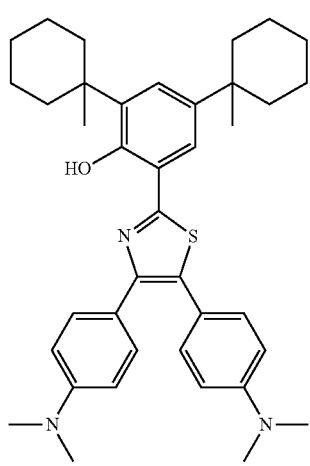
78
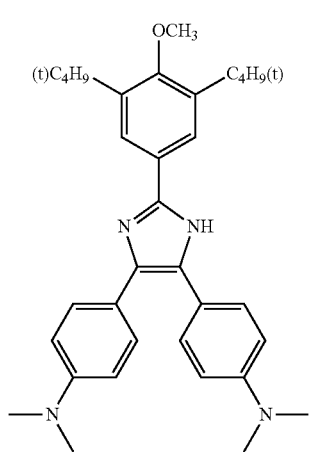
79

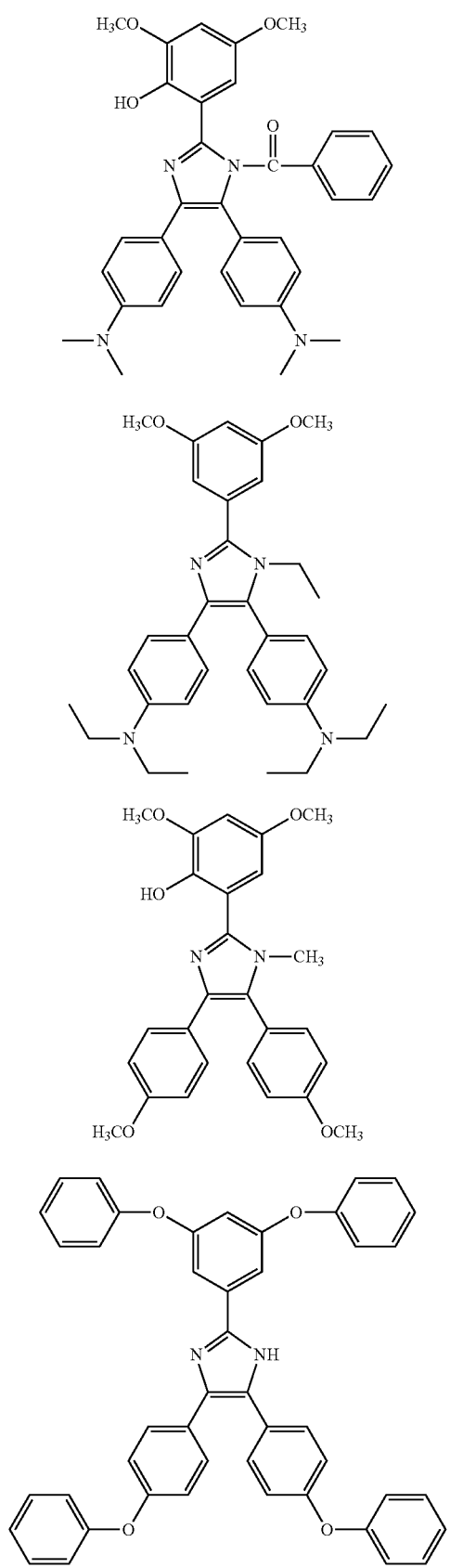
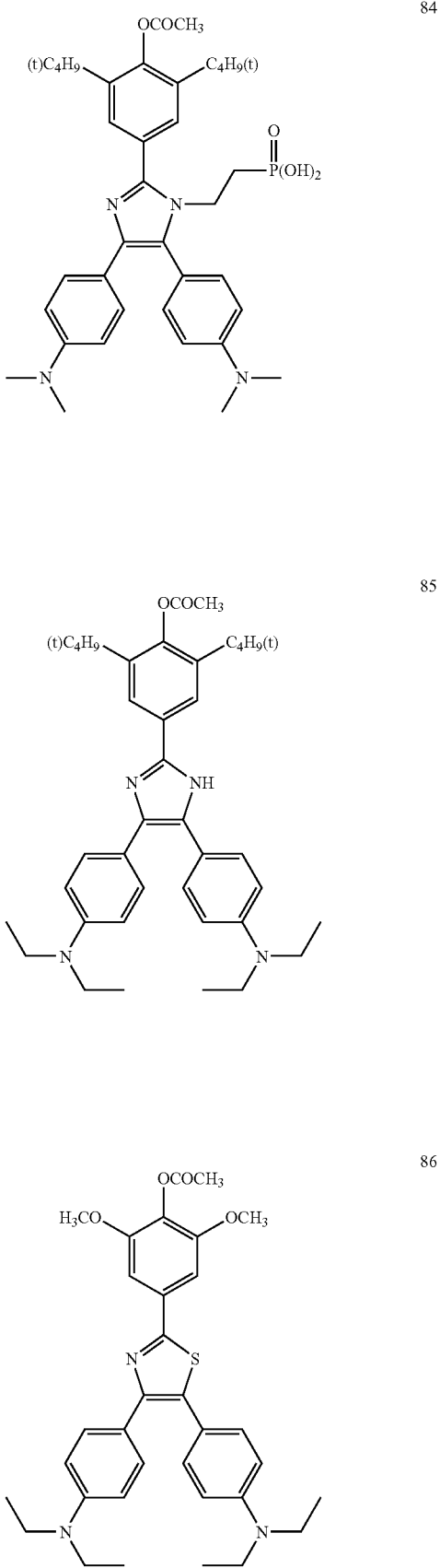

87
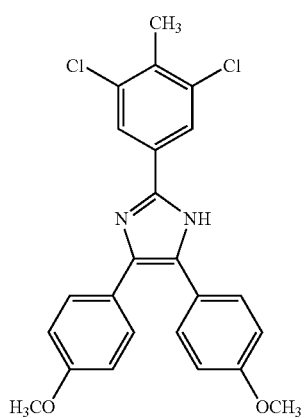
88
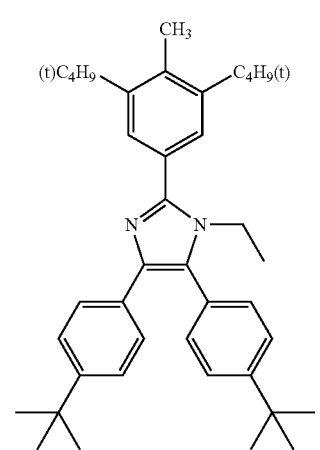
89
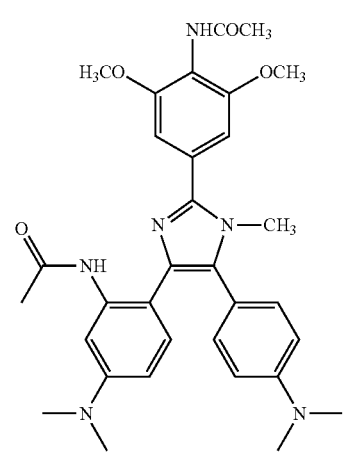
90
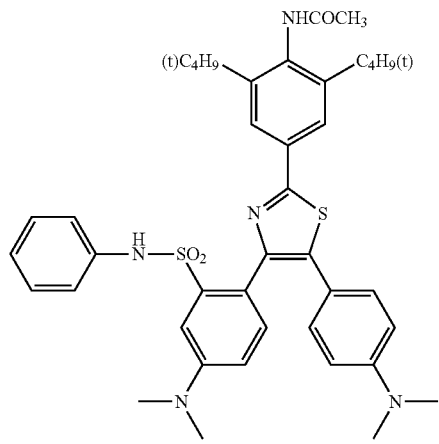
91
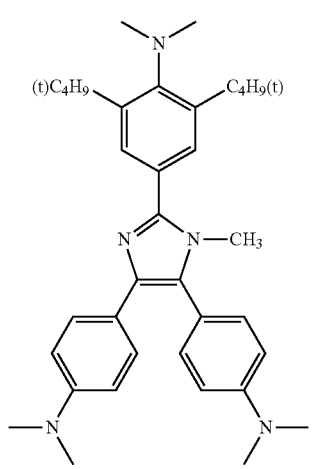
92

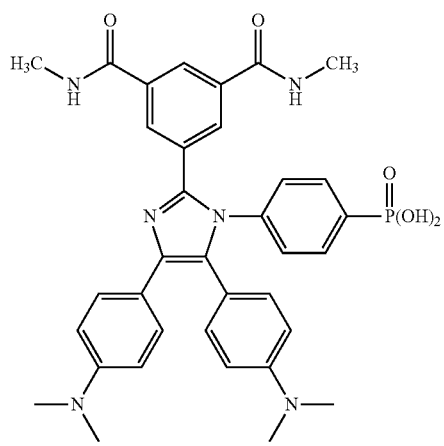
93
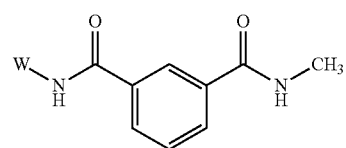
94
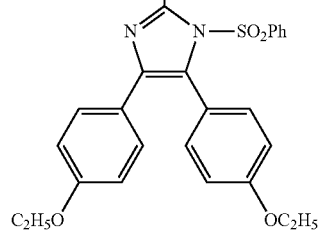
95
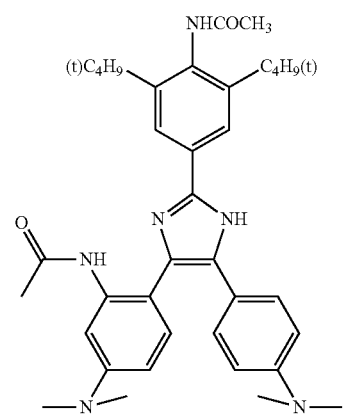
96
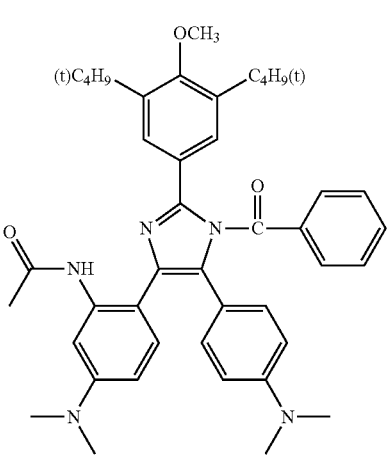
97
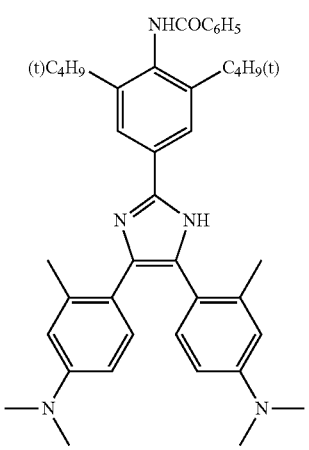
98
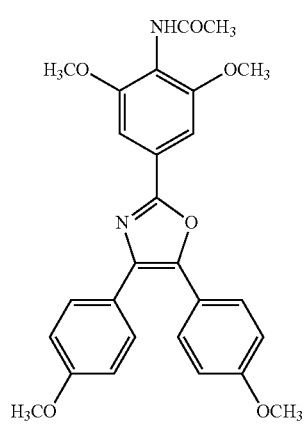
99

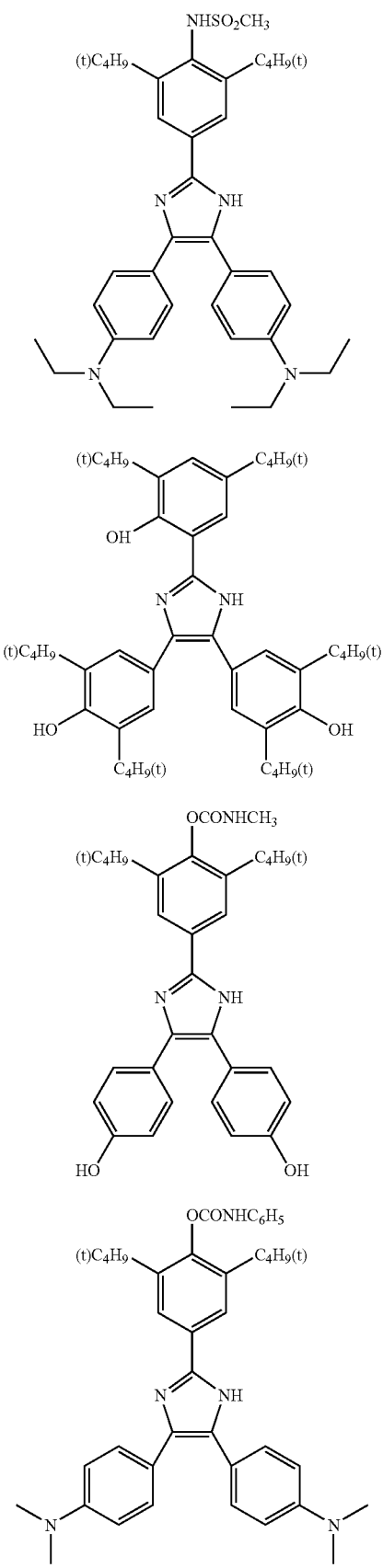
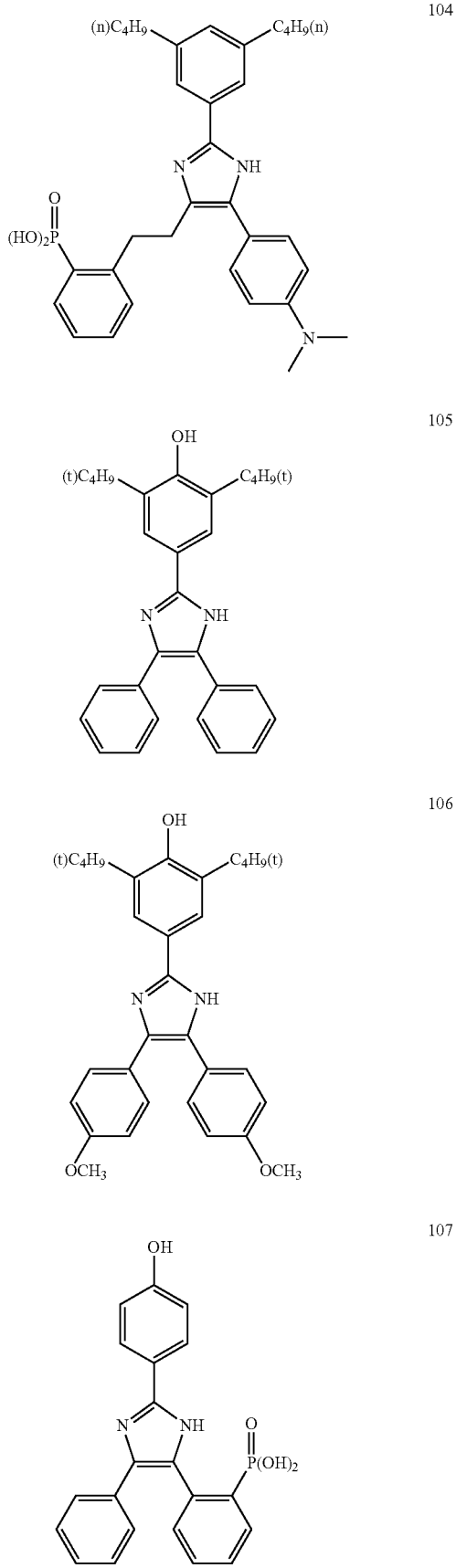

108

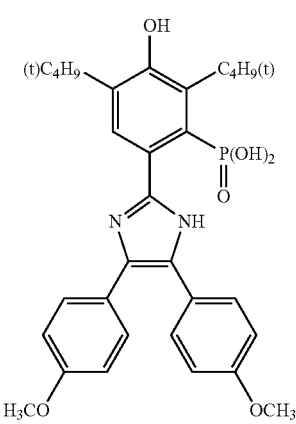

109

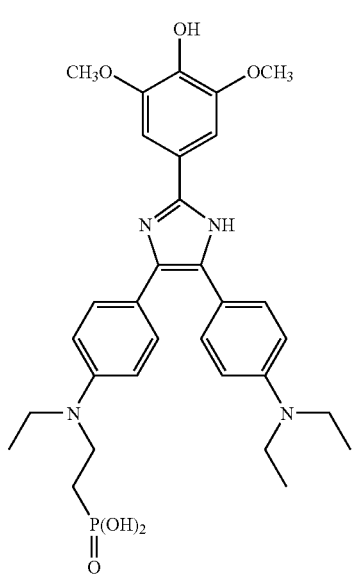

110

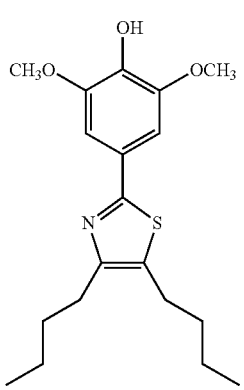

111

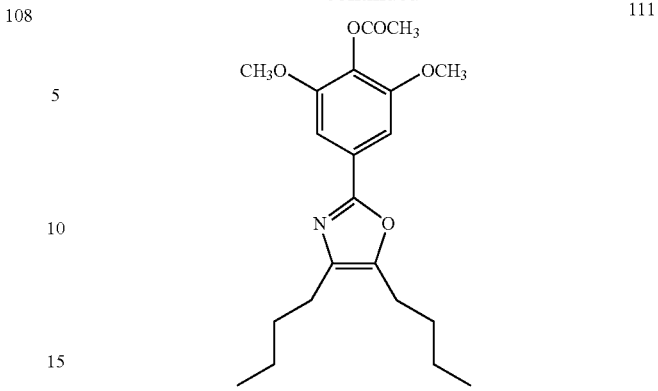

<Opposing Electrode>

A metal electrode or a transparent electrode can be used as an opposing electrode of the present invention. As a metal electrode, well known metals, for example, platinum, gold, silver, copper, aluminum, zinc, nickel, titanium and bismuth, and those alloys can be used. As the production method of electrodes, the existing methods, for example, a vacuum evaporation method, a printing method, an inkjet method, a spin coat method and a CVD method are applicable.

As a transparent electrode, there is no limitation as far as it is transparent and electrically conductive. Examples of a transparent electrode include: Indium Tin Oxide (ITO: indium tin oxide), Indium Zinc Oxide (IZO: indium zinc oxide), Fluorine doped Tin Oxide (FTO), indium oxide, zinc oxide, platinum, gold, silver, rhodium, copper, chromium, carbon, aluminum, silicon, amorphous silicon and BSO (Bismuth Silicon Oxide). Formation of an electrode in such a way can be carried out by depositing an ITO film using such as sputtering on a substrate using a mask or by forming an ITO film all over the substrate surface followed by patterning via photolithography. The surface resistance of the transparent electrode is preferably 100 ohms/☐ or less and more preferably 10 ohms/☐ or less. The thickness of the transparent electrode is not specifically limited, however, it is generally 0.1-20 μm.

As an opposing electrode of the present invention, in order to attain a thoroughly large color gamut of the full color display, it is preferable to use a transparent electrode and an ITO electrode is preferable from a viewpoint of light transmittance and resistance.

<Porous Layer>

A metal oxide is preferably used for the porous layer concerning the present invention. Example of a metal oxide include: titanium oxide, silicon oxide, zinc oxide, tin oxide, Sn doped indium oxide (ITO), antimony doped tin oxide (ATO), fluorine doped tin oxide (FTO) and aluminum doped zinc oxide, and a mixture thereof.

The present invention is characterized in that one of the porous layers, the porous layers being adjacent to the opposing electrodes, contains titanium oxide and the other porous layer contains tin oxide. By using the combination of titanium oxide and tin oxide, highly reversible coloring and decoloring of the electrochromic dye can be carried out with the applied voltage of 3V or less.

The porous layer is formed by binding or contacting a plurality of particles of abovementioned metal oxide. The average diameter of the metal oxide particles is preferably 5 nm-10 μm and more preferably 20 nm-1 μm. The specific surface area of the metal oxide particles determined by a simple BET method is preferably $1 \times 10^{-3}$-$1 \times 10^2$ m$^2$/g and more preferably $1 \times 10^{-2}$-10 m$^2$/g. As for the shape of the metal oxide particles, particles having an arbitrary shape such as indeterminate, needle-like and spherical are usable.

The thickness of the porous layer of the present invention is preferably 1 μm or more but 5 μm or less. When the thickness is 1 μm or less, a sufficient amount of electrochromic dye cannot be adsorbed, and when the thickness exceeds 5 μm, the resolution of the image is degraded, which is disadvantageous.

As the method to form or bind the metal oxide particles, a well-known sol-gel method or sintering method can be cited. For example, the methods disclosed in 1) Journal of the Ceramic Society of Japan, 102, 2, p 200 (1994), 2) Yogyo kyokai-shi 90, 4, p 157, and 3) J. of Non-Cryst. Solids, 82, 400 (1986) are applicable. Also, a porous electrode can be formed by forming titanium oxide dendrimer particles via a gaseous phase method, dispersing the particles in a solution, applying the solution on a substrate and drying the substrate at a temperature of 120-150° C. to remove the solvent.

In the display device in which pixel circuits are accumulated, there is an advantage that display unevenness among the pixels can be reduced by employing a low-temperature process such as the "chemical-solution depositing method" as disclosed in "Technology for low-resistance, low-temperature, large area film formation of transparent conductive film" (ISBN4-86104-078-7 C3058, published by Gijutsu Kyokai Co., Ltd., in July 2005), specifically, when the porous layer is connected to a part of the pixel circuit through the transparent electrode, since damage to the pixel circuits are small. The metal oxide particles are preferably bound to each other, and preferable is a state such that the resistance property measured by a continuous loading surface property tester (for example, a scratching intensity tester) is 0.1 g or more and preferably 1 g or more.

The "porous" as mentioned in the present invention means a penetrating state where ionic species can migrate through the porous layer and an electrochromic reaction can be conducted when the porous layers are arranged and an electric potential difference is applied between the opposing electrodes.

[White Scattering Layer]

In the present invention, in order to enable a white display, a white scattering layer can be provided between the opposing electrodes or outside the opposing electrodes. The white scattering layer applicable to the display device of the present invention is formed by coating an aqueous mixture of an aqueous polymer substantially insoluble in an electrolyte solvent and a white pigment, and drying it.

White pigments applicable to the present invention include, for example, titanium dioxide (anatase or rutile type), barium sulfate, calcium carbonate, aluminum oxide, zinc oxide, magnesium oxide and zinc hydroxide, magnesium hydroxide, magnesium phosphate, hydrogen magnesium phosphate, alkaline earth metal salt, talc, kaolin, zeolite, acid clay, glass; organic compounds such as polyethylene, polystyrene, acrylic resin, ionomer, ethylene-vinyl acetate copolymer resin, benzoguanamine resin, urea-formalin resin, melamine-formalin resin, polyamide resin. These are used singly or in combination, or in a state including voids changing refractive index.

Titanium dioxide, zinc oxide, zinc hydroxide are preferably employed among the white particles mentioned above in the present invention. Further, employed as titanium oxide may be titanium oxide which has been subjected to a surface treatment employing an inorganic oxide (such as $Al_2O_3$, AlO (OH), or $SiO_2$), or titanium oxide which has been subjected to a treatment employing an organic compound such as trimethylolethane, triethanolamine acetic acid salts, or trimethylcyclosilane, in addition to the above surface treatment.

It is preferable to employ titanium oxide or zinc oxide in preventing staining at high temperature and in reflectance due to index of refraction among these white particles. In the present invention, there are, as the aqueous polymer substantially insoluble in an electrolyte solvent, a water-soluble polymer and a polymer dispersible in an aqueous solvent.

Examples of a water-soluble compound include proteins such as gelatin and its derivatives; natural compounds including polysaccharides, such as cellulose derivatives, starch, gum arabic, dextran, pullulan and carrageenan; and synthetic polymer compounds such as polyvinyl alcohol, polyvinyl pyrrolidone, a acrylamide polymer and their derivatives. Gelatin derivatives include acetylated gelatin and phthalated gelatin, polyvinyl alcohol derivatives include an end alkyl-modified polyvinyl alcohol and an end mercapto-modified polyvinyl alcohol, and cellulose derivatives include hydroxyethyl cellulose, hydroxypropyl cellulose and carboxymethyl cellulose. There are also usable compounds described in Research disclosure or JP-A No. 64-13546 at page 71-75 and highly water-absorbing polymers described in U.S. Pat. No. 4,960,681 and JP-A No. 62-245260, such as homopolymers of vinyl monomer containing —COOM or —SO$_3$M (in which M is a hydrogen atom or an alkali metal) and copolymers of the foregoing monomers or those of these monomers and other vinyl monomers (e.g., sodium methacrylate, ammonium methacrylate, potassium methacrylate). These binders may be used singly or in combination.

In the present invention are preferably used gelatin and its derivatives, and polyvinyl alcohol and its derivatives.

Examples of a polymer dispersible in an aqueous solvent include natural rubber latex and latexes of styrene butadiene rubber, butadiene rubber, nitrile rubber, chloroprene rubber and isoprene rubber; and thermosetting resins dispersible in an aqueous solvent, such as polyisocyanate, epoxy, acryl, silicone, polyurethane, urea, phenol, formaldehyde, epoxypolyamide, melamine and alkyd resins and vinyl resin. Of these polymers, an aqueous polyurethane resin, as described in JP-A 10-76621, is preferred.

The expression, "being substantially insoluble in an electrolyte solvent" is defined as a dissolution amount per 1 kg of an electrolytic solvent being from 0 g to 10 g at a temperature of from −20° C. to 120° C. The dissolution amount can be determined by a weight measurement method or a component quantitative measurement method according to liquid chromatography or gas chromatography.

The aqueous mixture of an aqueous compound and a white pigment is preferably in the form of a white pigment dispersed in water according to a known dispersion method. The volume ratio of aqueous compound/white pigment is preferably in the range from 1 to 0.01, and more preferably from 0.3 to 0.05.

The aqueous mixture of an aqueous compound and a white pigment is coated on a medium and may be coated at any position thereof, as long as it is on a constituting component between opposing electrodes of the display device but is provided preferably on the surface of at least one of the opposing electrodes. Methods of providing on the medium include a coating system and a liquid-spraying system, including a spray system through gas phase, such as a system of jetting liquid droplets by employing vibration of a piezoelectric element, for example, a ink-jet head of a piezo-system, a bubble jet system (trade name) of jetting liquid droplets by using a thermal head employing bumping, and a spray system of spraying liquid by air pressure or liquid pressure.

A coating system can be chosen from commonly known coating systems, including, for example, an air doctor coater, a blade coater, a rod coater, a knife coater, a squeeze coater, a dipping coater, a reverse roller coater, a transfer roller coater, a curtain coater, a double roller coater, a slide hopper coater, a gravure coater, a kiss roller coater, a bead coater, a cast coater, a spray coater, a calender coater, and an extrusion coater.

An aqueous mixture of an aqueous compound and a white pigment which is provided on a medium may be dried by any method of evaporating water. Examples thereof include heating by a heat source, a heating method of using infrared light and a heating method employing electromagnetic induction. Distillation of water may be conducted under reduced pressure.

In the present invention, the expression "porous" is referred to as follows: the aqueous mixture of an aqueous compound and a white pigment is coated onto an electrode and dried to form a porous white scattering material. An electrolyte solution containing silver or a compound containing silver in the molecule is provided on the material and sandwiched by opposing electrodes, and when an electric potential difference is applied between the opposing electrodes to cause a dissolution and deposition reaction of silver, ionic species are movable and penetrable between the electrodes.

In the display device of the present invention, it is preferred to perform a hardening reaction of the aqueous compound by a hardening agent during or after coating or drying of the aqueous mixture.

As a hardening agent usable in the present invention are cited hardening agents described in, for example, U.S. Pat. No. 4,678,739, col. 41; U.S. Pat. No. 4,791,042; JP-A Nos. 59-116655, 62-245261, 61-18942, 61-249054, 61-245153, and 4-218044. Specific examples thereof include an aldehyde hardener, an aziridine hardener, an epoxy hardener, a vinylsulfone hardener [e.g., N,N'-ethylene-bis(vinylsulfonylacetoamido)ethane], a N-methylol hardener [e.g., dimethylol urea], boric acid and a polymeric hardener (compounds described in JP-A 62-234157). In case when using gelatin as an aqueous compound, a vinylsulfone hardener or chlorotriazine hardener is preferably used singly or in combination. Further, when polyvinyl alcohol is employed, it is preferable to employ boron-containing compounds such as boric acid and metaboric acid.

These hardening agents are used preferably in amount of from 0.001 to 1 g per g of aqueous compound, and more preferably from 0.005 to 0.5 g. It is feasible to control humidity during heat treatment or hardening reaction to enhance layer strength.

[Electrolyte Materials]

In the display device of the present invention, the electrolyte may contain the following compounds when the electrolyte is liquid. Listed as potassium compounds are KCl, KI, and KBr, as lithium compounds are $LiBF_4$, $LiClO_4$, $LiPF_6$, and $LiCF_3SO_3$, and as tetraalkylammonium compounds are tetraethylammonium perchlorate, tetrabutylammonium perchlorate, tetraethylammonium borofluoride, tetrabutylammonium borofluoride, and tetrabutylammonium halide. Further, a molten salt electrolytic composition described in Paragraphs [0062]-[00811]of JP-A 2003-187881 can be preferably used. Further, a compound can be employed, which becomes an oxidation-reduction pair such as $I^-/I_3^-$, $Br^-/Br_3^-$, or quinone/hydroquinone.

Further, the electrolyte may contain the following compounds exhibiting electronic conductivity and ionic conductivity, when a supporting electrolyte is solid.

Such compounds include a vinyl fluoride polymer containing perfluorosulfonic acid, polythiophene, polyaniline, polypyrrole, triphenylamines, polyvinyl carbazoles, polymethylphenylsilanes, chalcogenides such as $Cu_2S$, $Ag_2S$, $Cu_2Se$, or $AgCrSe_2$, fluorine-containing compounds such as $CaF_2$, $PbF_2$, $SrF_3$, $LaF_3$, $TlSn_2F_5$, or $CeF_3$, Li salts such as $Li_2SO_4$, $Li_4SiO_4$, or $Li_3PO_4$, $ZrO_2$, $CaO$, $Cd_2O_3$, $HfO_2$, $Y_2O_3$, $Nb_2O_5$, $WO_3$, $Bi_2O_3$, $AgBr$, $AgI$, $CuCl$, $CuBr$, $CuBr$, $CuI$, $LiI$, $LiBr$, $LiCl$, $LiAlCl_4$, $LiAlF_4$, $AgSBr$, $C_5H_5NHAg_5I_6$, $Rb_4Cu_{16}I_7Cl_{13}$, $Rb_3Cu_7Cl_{10}$, $LiN$, $Li_5NI_2$ and $Li_6NBr_3$.

Further, it is possible to employ a gel-like electrolyte as a supporting electrolyte. When the electrolyte is non-aqueous, it is possible to employ oil gelling agents described in Paragraphs [0057]-[0059] of JP-A 11-185836.

[Solvent Added to Electrolyte]

In the display device of the present invention, a solvent can be used in the extent which may not degrade the effect of the present invention. Specific examples of a solvent include: tetramethylurea, a sulfolane, dimethyl sulfoxide, 1,3-dimethyl-2-imidazolidinone, 2-(N-methyl)-2-pyrrolidinone, hexamethylphosphortriamide, N-methylpropione amide, N,N-dimethylacetamide, N-methyl acetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethylacetate, ethylpropionate, dimethoxyethane, diethoxy furan, tetrahydrofuran, ethylene glycol, diethylene glycol, tri ethylene glycol monobutyl ether and water. Among these solvents, it is preferable that at least one solvent having a freezing point of not higher than $-20°$ C. and a boiling point of $120°$ C. or more is contained.

Further, the solvents which can be used in the present invention include the compounds described in: J. A. Riddick, W. B. Bunger, T. KSakano, "Organic Solvents", 4th ed., John Wiley&Sons (1986); Y. Marcus, "Ion Solvation", John Wiley&Sons (1985); C. Reichardt, "Solvents and Solvent Effects in Chemistry", 2nd ed., VCH (1988); and G. J. Janz, R. P. T. Tomkins, "Nonaqueous Electorlytes Handbook", Vol. 1, Academic Press (1972).

[Thickener Added to Electrolyte]

It is possible to add a thickener to the electrolyte in the display device of the present invention. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals), such as poly(vinyl formal and poly(vinyl butyral), poly(esters), poly(urethanes), phenoxy resins, poly(vinylidene chloride), poly(epoxides), poly(carbonates), poly (vinyl acetate), cellulose esters, poly(amides). Hydrophobic transparent binders include polyvinyl butyral, cellulose acetate, cellulose acetate butyrate, polyester, polycarbonate, polyacrylic acid, and polyurethane.

These thickeners may be employed in combinations of at least two types. Further listed may be the compounds described on pages 71-75 of JP-A S64-13546. Of these, polyvinyl alcohols, polyvinylpyrrolidones, hydroxypropyl celluloses, and polyalkylene glycols are preferably employed in view of enhancement of compatibility with various additives and improvement of white particle dispersion stability.

[Other Additives]

The component layers of the display device of the present invention may include subsidiary layers such as a protective layer, a filter layer, an antihalation layer, a cross-over light cutting layer, or a backing layer. If desired, various types of chemical sensitizers, noble metal sensitizers, sensitizing dyes, supersensitizing dyes, couplers, high-boiling point solvents, antifoggants, stabilizers, development restrainers, bleach accelerators, fixing accelerators, color mixing inhibitors, formalin scavengers, toning agents, hardeners, surface active agents, thickeners, plasticizers, lubricants, UV absorbers, anti-irradiation dyes, filter light absorbing dyes, fungicides, polymer latexes, heavy metals, antistatic agents, and matting agents may be incorporated in the subsidiary layers.

These additives, described above, are detailed in Research Disclosure (hereinafter referred to as RD), Volume 176 Item/17643 (December 1978), Volume 184 Item/18431 (August 1979), Volume 187 Item/18716 (November 1979), and Volume 308. Item/308119 (December 1989).

Types and listed positions of the compounds cited in these three Research Disclosures are described below.

| Additive | RD 17643 Page & Class | RD 18716 Page & Class | RD 308119 Page & Class |
|---|---|---|---|
| Chemical Sensitizer | 23 III | 648 upper right | 96 III |
| Sensitizing Dye | 23 IV | 648-649 | 996-998 IV |
| Desensitizing Dye | 23 IV | | 998 IV |
| Dye | 25-26 VIII | 649-650 | 1003 VIII |
| Development Accelerator | 29 XXI | 648 upper right | |
| Antifoggant, Stabilizer | 24 IV | 649 upper right | 1006-1007 VI |
| Whitening Agent | 24 V | | 998 V |
| Hardener | 26 X | 651 left | 1004-5 X |
| Surface Active Agent | 26-27 XI | 650 right | 1005-1006 XI |
| Antistatic Agent | 27 XII | 650 right | 1006-1007 XIII |
| Plasticizer | 27 XII | 650 right | 1006 XII |
| Lubricant | 27 XII | | |
| Matting Agent | 28 XVI | 650 right | 1008-1009 XVI |
| Binder | 26 XXII | | 1003-1004 IX |
| Support | 28 XVII | | 1009 XVII |

[Substrate]

As the substrate usable in the present invention are preferably used synthetic plastic films composed, for example, of polyolefins such as polyethylene or polypropylene, polycarbonates, cellulose acetate, polyethylene terephthalate, polyethylenedinaphthalene dicarboxylate, polyethylene naphthalates, polyvinyl chloride, polyimide, polyvinyl acetals, or polystyrene. Further, preferred are syndiotactic-structured polystyrenes. These can be prepared, employing the methods described, for example, in JP-A 62-117708, JP-A 1-46912, and JP-A 1-178505. Further listed are metal substrates of stainless steel, paper supports such as baryta paper or resin-coated paper, supports composed of the above plastic film having thereon a reflection layer, and those described, as a support, in JP-A 62-253195 (pages 29-31). It is possible to preferably employ those described on page 28 of RD No. 17643, from the light column on page 647 to the left column on page 648 of RD No. 18716, and on page 879 of RD No. 307105.

As described in U.S. Pat. No. 4,141,735, the supports can be used which is subjected to a thermal treatment at a temperature below Tg so that core-set curl is minimized. Further, the surface of these supports may be subjected to a surface treatment for the purpose of enhancement of adhesion of the support to another constitution layer. In the present invention employed as a surface treatment may be a glow discharge treatment, an ultraviolet radiation treatment, a corona treatment, and a flame treatment. Further, employed may be supports described on pages 44-149 of Kochi Gijutsu (Known Technology) No. 5 (published by AZTEC Japan., Mar. 22, 1991). Further listed are those described on page 1009 of RD No. 308119, as well as in the item "Supports" on page 108 of Product Licensing Index Volume 92. Other than the above, employed may be glass substrates and epoxy resins kneaded with glass powder.

[Other Component Materials in Display Device]

Sealing agents, columnar materials, and spacer particles may be employed in the display device of the present invention, if desired.

Sealing agents are those which perform sealing so that leak to the exterior is minimized, and are called sealants. Employed as sealing agents may be heat curing, light curing, moisture curing, or anaerobic curing type resins such as epoxy resins, urethane resins, acryl resins, vinyl acetate resins, en-thiol resins, silicon-containing resins or modified polymer resins.

The columnar materials provide a strong self-supporting capability (strength) between substrates. For example, listed may be a cylindrical form, a quadrangular form, an elliptic from, and a trapezoidal form which are arranged at definite intervals in a specified pattern such as a lattice. Further employed may be stripe-shaped ones arranged at definite intervals. It is preferred that the columnar materials are not randomly arranged but arranged at an equal distance so that the interval gradually varies, or a predetermined pattern is repeated at a definite cycle so that the distance between substrates is nearly maintained and image display is not degraded. When the columnar materials are such that the ratio of the area occupied by the display region of a display device is 1-40%, sufficient strength as a display device for commercial viability is obtained.

Spacers may be provided between paired substrates in order to maintain a uniform gap between them. As such spacers, exemplified may be spheres composed of resins or inorganic oxides. Further suitably employed are adhesion spacers, the surface of which is coated with thermoplastic resins. Columnar materials only may be provided in order to maintain a uniform gap between the substrates. However, both spacers and columnar materials may be provided. Instead of the columnar materials, only spacers may be employed as space-maintaining members. The diameter of spacers, when a columnar material is formed, is at most its height, but is preferably equal to the above height. When no columnar material is formed, the diameter of spacers corresponds to the thickness of the cell gap.

[Screen Printing]

It is possible to form sealing agents, columnar materials, and electrode patterns, employing a screen printing method in the present invention. In screen printing methods, a screen, on which predetermined patterns are formed, is applied onto the electrode surface, and printing materials (compositions to form columnar materials such as light-curing resins) are placed on the screen. Subsequently, a squeegee is moved at a predetermined pressure, angle and rate. By such action, the printing materials are transferred onto the above substrate via the pattern of the screen. Subsequently, the transferred materials are thermally cured and dried. When columnar materials are formed employing the screen printing method, resinous materials are not limited to light-curing resins, but also employed, for example, may be heat curable resins such as epoxy resins or acryl resins, as well as thermoplastic resins. Listed as thermoplastic resins are: polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluororesins, polyurethane resins, polyacrylonitrile resins, polyvinyl ether resins, polyvinyl ketone resins, polyether resins, polyvinylpyrrolidone resins, saturated polyester resins, polycarbonate resins, and chlorinated polyether resins. It is preferable that resinous materials are employed in the form of a paste, while dissolved in suitable solvents.

As noted above, after forming the columnar materials on the substrate, if desired, a spacer is provided on at least one side of the substrate, and paired substrates are placed so that the electrode forming surfaces face each other, whereby a vacant cell is formed. By heating the paired facing substrates, under application of pressure from both sides, they are adhered to each other, whereby a display cell is obtained. Preparation of a display device may be achieved by injecting an electrolyte composition between the substrates, employing a vacuum injection method. Alternatively, during adhesion of the substrates, an electrolyte composition may be dripped onto the surface of one of the substrates and then a liquid crystal composition is injected simultaneously sealed when the substrates are adhered to each other.

[Construction of Full Color Display Device]

When a full color display is performed using the electrochromic display device of the present invention,
1. A method to stack electrochromic display devices which colors and decolors in different colors of, for example, Yellow, Magenta, Cyan, Red, Green, Blue, Black,
2. A method to arrange a plurality of porous layers containing titanium oxide adsorbed with electrochromic dyes which color and decolor in different colors on a plane to form a pattern, and
3. A method to adsorb a plurality of electrochromic dyes which color and decolor in different colors to the same porous layer containing titanium oxide arranged between a pair of opposing electrodes, are applicable.

In the case of above method 3, it is necessary to give a threshold value to an electrochromic dye. As the method to give a threshold value, cited is a method to vary the voltage or the amount of charge, or the voltage hysteresis in the directions of coloration and decoloration for each of the electrochromic dyes.

[Driving Method of Display Device]

In the active-matrix drive concerning the present invention, scanning lines, data lines, and current supply lines are formed to form a grid pattern and drive is carried out by the TFT circuit provided on each grid. Since switching can be conducted on each pixel, there is an advantage that gradation control or memory effect is available. For example, the circuit disclosed in FIG. 5 of JP-A No. 2004-29327 and the method disclosed in "Electrochromic Display" pages 77-102 (published by Sangyo Tosho Co., Ltd., 1991) can be used.

It is one of the characteristic features of the present invention that the porous layer containing the tin oxide is connected to a pixel circuit used for the active matrix drive through one of the opposing electrodes. For example, in FIGS. 2 and 3 in which only the switching transistor for the simplest coloring drive is shown, the contact is made to the drain of the switching transistor, whereby the other electrode having the porous layer containing the titanium oxide adsorbed with the electrochromic dye is disconnected. As the result, leakage of current tends not to occur, and there is an advantage that color drift while displaying a color image tends not to occur.

In a practical pixel circuit, transistors to drive damping or erasing, besides coloring, are provided together with power supply lines for those transistors, and contact is made, for example, as shown in the equivalent circuit of FIG. 8 of the above JP-A 2004-29327, however, the effect of the present invention is absolutely the same.

[Application to Products]

It is possible to apply the display device of the present invention to electronic book related fields, ID card related fields, public information related fields, transportation related fields, broadcasting related fields, account settling fields, and distribution and logistics related fields. Typical examples of the products applied include door keys, student identification cards, employee ID cards, various club membership cards, convenience store cards, department store cards, vending machine cards, gas station cards, subway and railroad cards, bus cards, cash cards, credit cards, highway cards, driver licenses, hospital medical examination cards, health insurance cards, Basic Resident Registers, passports, and electronic books.

EXAMPLES

Although an embodiment is given and the present invention is described concretely hereafter, the present invention is not limited to these.

In addition, although the "section" or "%" of display is used in an embodiment, as long as there is no notice in particular, "weight part" or "wt %" is represented.

The electrochromic dyes used in the following examples will be shown below.

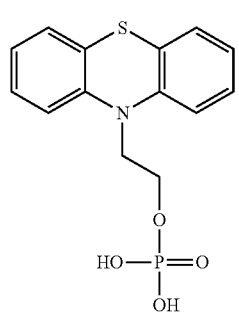

Ex1

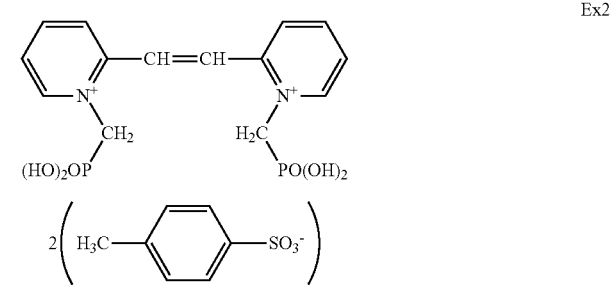

Ex2

-continued

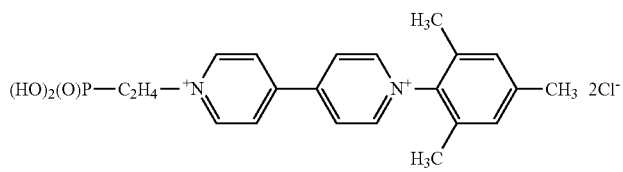
Ex3

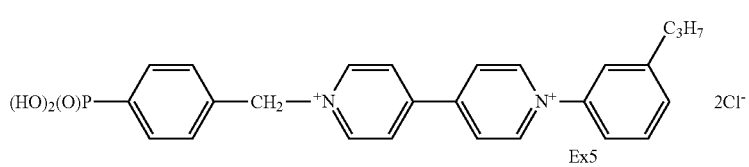
Ex4

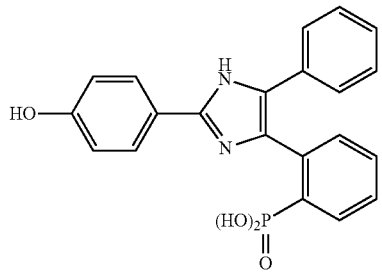
Ex5

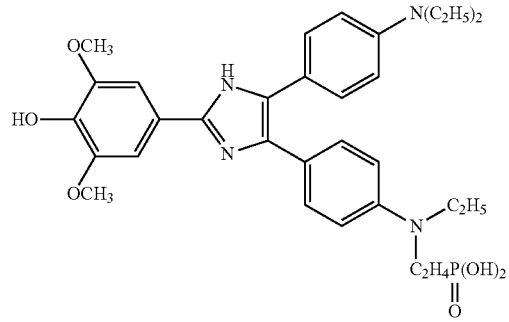
Ex6

Example 1

<Production of Display Device 1>

By taking a contact (connection) with the drain electrode of a TFT circuit which was formed according to the well-known method (as illustrated in the conventional circuit of FIG. 1), an ITO electrode was formed, on which titanium oxide (an average primary particle diameter of 30 nm) dispersed in terpineol was applied, followed by calcinating at 350° C. for 1 hour to form a titanium oxide porous layer (dry thickness of 10 μm). The product was immersed in a 10 mmol/L ethanol solution of electrochromic dye Ex1 for 4 hours to adsorb Ex1 in the titanium oxide porous layer, followed by evaporating ethanol, to obtain Member 1. Next, tin oxide doped with antimony (an average primary particle diameter of 30 nm) dispersed in terpineol was applied on an ITO electrode, followed by calcinating at 350° C. for 1 hour to form a tin oxide porous layer (dry thickness of 10 μm) which is designated as Member 2. A 100 μm spacer was sandwiched by Members 1 and 2, and the peripherals were sealed with a UV curable epoxy resin, followed by injecting a γ-butyrolactone solution containing 1 mmol/L of lithium perchlorate between the Members 1 and 2 to obtain Display device 1.

<Production of Display Device 2>

Display device 2 was produced in the same manner as described for Display device 1, except that Ex2 was used instead of Ex1.

<Production of Display Device 3>

Display device 3 was produced by stacking Display devices 1 and 2.

<Production of the Display Device 4>

Display device 4 was produced in the same manner as described for Display device 3, except that:

the titanium oxide porous layer of Display device 1 was replaced with a tin oxide porous layer;

the tin oxide porous layer of Display device 1 was replaced with a titanium oxide porous layer;

the titanium oxide porous layer of Display device 2 was replaced with a tin oxide porous layer; and the tin oxide porous layer of Display device 2 was replaced with a titanium oxide porous layer.

<Evaluation of Display Device>

A voltage of 1.5V was arbitrarily applied to Display device 3 and the chromaticity E1(a*,b*) at a colored state of L*=60 was determined using a spectrophotometer CM-3700d produced by Konica Minolta Sensing Inc. Subsequently, the display device was left for 60 second while no voltage was applied and then the chromaticity E2(a*,b*) was determined again using CM-3700d. From the above results, Δ=|E2−E1| was calculated, followed by calculating $$\Delta E = ((\Delta a^*)^2 + (\Delta b^*)^2)^{1/2}$$

using respective differences Δa* and Δb*.

A smaller ΔE means that color drift while storing an image is smaller. When ΔE of Display device 3 was represented as ΔE3 and ΔE of Display device 4 was represented as ΔE4, ΔE3/ΔE4=1.75, which meant that the construction of the display device of the present invention was superior.

Example 2

Ex1 and Ex2 of Display devices 3 and 4 were changed to Ex3 (Exemplified compound (3)) and Ex4 (Exemplified compound (15)), respectively, to produce Display devices 5 and 6. When ΔE of Display device 5 was represented as ΔE5 and ΔE of Display device 6 was represented as ΔE6, ΔE5/ΔE6=1.98, which meant that the construction of the display device of the present invention was superior.

Example 3

Ex1 and Ex2 of Display devices 3 and 4 were changed to Ex5 (Exemplified compound (107)) and Ex6 (Exemplified compound (109)), respectively, to produce Display devices 7 and 8. When ΔE of Display device 7 was represented as ΔE7 and ΔE of Display device 8 was represented as ΔE8, ΔE7/ΔE8=2.69, which meant that the construction of the display device of the present invention was superior.

Example 4

Display devices 9 and 10 were produced in the same manner as described for Display devices 7 and 8, respectively, except that the dry thicknesses of the titanium oxide porous layers and the tin oxide porous layers of Display devices 7 and 8 were changed to 3 μm. When ΔE of Display device 9 was represented as ΔE9 and ΔE of Display device 10 was represented as ΔE10, ΔE9/ΔE10=3.61, which meant that the construction of the display device of the present invention was superior.

Example 5

When the layer stacking structures of Display devices 9 and 10 each were changed to a planar pattern arrangement, a similar effect to that obtained in Example 4 was obtained.

Embodiment 6

Display device 11 was produced by changing Ex1 of Display device 1 to three dyes EC1-EC3 disclosed in JP-A No. 2006-106669.

Further, the titanium oxide porous layer of Display device 11 was replaced with a tin oxide porous layer and the tin oxide porous layer of Display device 11 was replaced with a titanium oxide porous layer to produce Display device 12.

EC1;1-benzyl-1'-(2-phosphonoethyl)-4,4'-bipyridinium dibromide

EC2;1-ethyl-1'-(2-phosphonopropyl)-4,4'-bipyridinium dibromide

EC3;1-ethyl-1'-(2-phosphonoethyl)-4,4'-bipyridinium dibromide

When the apply voltage was varied according to the driving method disclosed in JP-A No. 2006-106669 and ΔE11 and ΔE12 were determined according to the same evaluation method, ΔE11/ΔE12=4.05, whereby the effect of the present invention was further exhibited.

What is claimed is:

1. An electrochromic display device driven by a pair of opposing electrodes; at least one porous layer containing titanium oxide to which an electrochromic dye is adsorbed; and at least one porous layer containing tin oxide, wherein the porous layer containing tin oxide is connected to an active matrix pixel circuit through one of the opposing electrodes, wherein the electrochromic dye is represented by the following Formula (2):

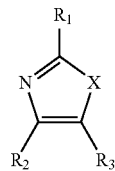

Formula (2)

wherein $R_1$ represents a substituted or non-substituted aryl group, $R_2$, $R_3$ each represent a hydrogen atom or a substituent, and X represents >N-$R_4$, an oxygen atom or a sulfur atom, wherein $R_4$ represents a hydrogen atom or a substituent.

2. The electrochromic display device of claim 1, wherein a thickness of the porous layer containing titanium oxide or the porous layer containing tin oxide is 1 μm or more but 5 μm or less.

3. The electrochromic display device of claim 2, wherein the electrochromic display device is capable of displaying a plurality of colors by stacking a plurality of electro chromic display devices.

4. The electrochromic display device of claim 2, wherein the electrochromic display device is capable of displaying a plurality of colors by arranging a plurality of porous layers containing titanium oxide adsorbed with different electrochromic dyes to forma pattern between the opposing electrodes.

5. The electrochromic display device of claim 2, wherein the electrochromic display device is capable of displaying a plurality of colors by adsorbing a plurality of electrochromic dyes to the same porous layer containing titanium oxide.

6. The electrochromic display device of claim 1, wherein the electrochromic display device is capable of displaying a plurality of colors by stacking a plurality of electrochromic display devices.

7. The electrochromic display device of claim 6, wherein the electrochromic display device is capable of displaying a plurality of colors by adsorbing a plurality of electrochromic dyes to the same porous layer containing titanium oxide.

8. The electrochromic display device of claim 1, wherein the electrochromic display device is capable of displaying a plurality of colors by arranging a plurality of porous layers containing titanium oxide adsorbed with different electrochromic dyes to form a pattern between the opposing electrodes.

9. The electrochromic display device of claim 1, wherein the electrochromic display device is capable of displaying a plurality of colors by adsorbing a plurality of electrochromic dyes to the same porous layer containing titanium oxide.

10. The electrochromic display device of claim 1, wherein $R_1$ represents a substituted or unsubstituted phenyl group.

11. The electrochromic display device of claim 10, wherein $R_2$ and $R_3$ each represents an alkyl group, a cycloalkyl group, an aromatic group, or a heterocycle group.

12. The electrochromic display device of claim 10, wherein a selected one of $R_2$ and $R_3$ represents a phenyl group and the other represents an alkyl group.

13. The electrochromic display device of claim 10, wherein both $R_2$ and $R_3$ represent a phenyl group.

14. The electrochromic display device of claim 10, wherein $R_4$ represents a hydrogen atom, an alkyl group, an aromatic group, a heterocycle group, or an acyl group.

15. The electrochromic display device of claim 1, wherein $R_1$ represents a substituted or unsubstituted 2-hydroxyphenyl group or a 4-hydroxyphenyl group.

16. The electrochromic display device of claim 1, wherein $R_2$ and $R_3$ each represents an alkyl group, a cycloalkyl group, an aromatic group, or a heterocycle group.

17. The electrochromic display device of claim 1, wherein a selected one of $R_2$ and $R_3$ represents a phenyl group and the other represents an alkyl group.

18. The electrochromic display device of claim 1, wherein $R_2$ and $R_3$ both represent a phenyl group.

19. The electrochromic display device of claim 1, wherein $R_4$ represents a hydrogen atom, an alkyl group, an aromatic group, a heterocycle group, or an acyl group.

20. The electrochromic display device of claim 1, wherein $R_4$ represents a hydrogen atom, an alkyl group having 1 to 10 carbon atoms, an aryl group having 5 to 10 carbon atoms, or an acyl group.

* * * * *